United States Patent [19]

Mukaiyama et al.

[11] Patent Number: 5,627,117
[45] Date of Patent: May 6, 1997

[54] OLEFIN POLYMERIZATION CATALYST AND PROCESS FOR OLEFIN POLYMERIZATION

[75] Inventors: Teruaki Mukaiyama, Tokyo; Makoto Mitani; Kunihiro Oouchi, both of Sodegaura, all of Japan

[73] Assignee: Mitsui Petrochemical Industries, Ltd., Tokyo, Japan

[21] Appl. No.: 364,477

[22] Filed: Dec. 27, 1994

[30] Foreign Application Priority Data

Dec. 27, 1993 [JP] Japan .................................. 5-333623
Dec. 27, 1993 [JP] Japan .................................. 5-333624

[51] Int. Cl.$^6$ .......................... C08F 4/622; C08F 4/623; C08F 10/00
[52] U.S. Cl. .......................... 502/113; 502/103; 502/117; 502/153; 502/154; 502/127; 502/131; 502/133; 502/160; 526/114; 526/115; 526/116; 526/126
[58] Field of Search .................................. 502/103, 113, 502/118, 117, 153, 154

[56] References Cited

U.S. PATENT DOCUMENTS

| | | |
|---|---|---|
| 4,530,914 | 7/1985 | Ewen et al. . |
| 4,542,199 | 9/1985 | Kaminsky et al. . |
| 4,701,432 | 10/1987 | Welborn, Jr. . |
| 4,769,510 | 9/1988 | Kaminsky et al. . |
| 4,892,851 | 1/1990 | Ewen et al. . |
| 4,935,474 | 6/1990 | Ewen et al. . |
| 4,937,299 | 6/1990 | Ewen et al. . |
| 4,990,640 | 2/1991 | Tsutsui et al. . |
| 5,124,418 | 6/1992 | Welborn, Jr. . |
| 5,240,895 | 8/1993 | Carney et al. . |
| 5,324,800 | 6/1994 | Welborn, Jr. et al. . |
| 5,334,677 | 8/1994 | Razavi et al. . |
| 5,359,102 | 10/1994 | Inoue et al. . |
| 5,372,980 | 12/1994 | Davis et al. . |

FOREIGN PATENT DOCUMENTS

| | | |
|---|---|---|
| 423872 | 4/1991 | European Pat. Off. . |
| 0528041 | 2/1993 | European Pat. Off. . |
| 550075 | 7/1993 | European Pat. Off. . |
| 0574794 | 12/1993 | European Pat. Off. . |
| 9313140 | 7/1993 | WIPO . |
| 9411410 | 5/1994 | WIPO . |

OTHER PUBLICATIONS

Derwent Info. Ltd. 1995 WPI Acc No.: 93–317512/40 Abstract JP 05230135 A.

Macromolecules 1993, 26, 3239–3240, Effect of Counterion Structure on Zirconocenium Catalysis of Olefin Polymerization.

J. Am Chem. Soc. 1991, 113, 3623–3625, "Cation–like" Homogenous Olefin Polymerization Catalysts Based Upon Zirconocene Alkyls and . . . .

Journal of Organometallic Chemistry, 383 (1990) 227–252, Elsevier Sequoia S.A. Lausanne—Printed in The Netherlands JOM 20237.

Organometallics 1992, 11, 3942–3947, Nifant'ev et al. "Synthesis . . . . "

Organometallics 1990, 9, 2142–2148, Wielstra et al. "Binuclear . . . . "

Organometallics 1989, 8, 2107–2113, Reddy et al. "Synthesis . . . . "

Organometallics 1987, 6, 897–899, Gambarotta et al. "Synthesis . . . . "

Synlett, pp. 493–500, McGovern et al. "The Synthesis and Novel Reactivity . . . . "

*Primary Examiner*—Edward J. Smith
*Attorney, Agent, or Firm*—Sherman and Shalloway

[57] ABSTRACT

Disclosed in an olefin polymerization catalyst comprising a transition metal compound having at least two transition metals in which at least one of said metals is bonded to a ligand having a cyclopentadienyl skeleton, at least one of said metals is selected from Sc, Y, Ti, Zr, Hf, V, Nb, Ta, Cr, Mo, W and lanthanoid metals and at least on of the others is selected from the specific transition metals; and an organoaluminum oxy-compound or an organoboron compound. Corresponding to the kind of the metal combined with said metal selected from Sc, Y, Ti, Zr, Hf, V, Nb, Ta, Cr, Mo, W and lanthanoid metals, the olefin polymerization catalyst exhibit a property to give polymers having a wide molecular weight distribution in spite of the catalyst system using one kind of a transition metal compound, or to give polymers having high molecular weight and be excellent in the polymerization activity at low polymerization temperature.

24 Claims, 3 Drawing Sheets

(A) Transition metal component $M^1, M^2$ : Zr, Ti, Hf, etc.
($M^1$ and $M^2$ are the same as each other)
$Cp^1, Cp^2$ : group having a cyclopentadienyl skeleton
X, Y : ligand, etc.
$R^1$ : single bond, etc.
n : 1~5
m : 1~5

(B) Organometallic component

Organoaluminum oxy-compound or
Organoboron compound (Organoaluminum compound)

Olefin (A) Transition metal component $M^3, M^4$ : Zr, Ti, Hf, etc.
($M^3$ and $M^4$ are different from each other)
$Cp^1, Cp^2$ : group having a cyclopentadienyl skeleton
X, Y : ligand, etc.
$R^2$ : single bond, etc.
n : 1 ~ 5
m : 1 ~ 5

(B) Organometallic component

Olefin (A) Transition metal component

M⁷ : Zr, Ti, Hf, etc.
M⁸ : Fe, etc.
Cp¹, Cp² : group having
          a cyclopentadienyl
          skeleton
X, Y : ligand, etc.
R¹ : single bond, etc.
n : 1～5
m : 1～5

(B) Organometallic component ( Organoaluminum oxy-compound )

or
Organoboron compound ( (Organoaluminum compound) )

Olefin

OLEFIN POLYMERIZATION CATALYST AND PROCESS FOR OLEFIN POLYMERIZATION

FIELD OF THE INVENTION

The present invention relates to an olefin polymerization catalyst and a process for olefin polymerization. More particularly, the invention relates to an olefin polymerization catalyst comprising a specific transition metal compound and either an organoaluminum oxy-compound component or an organoboron compound component, and to a process for olefin polymerization using said catalyst.

BACKGROUND OF THE INVENTION

A catalyst comprising a zirconium compound and aluminoxane has been recently proposed as an olefin polymerization catalyst. For instance, catalyst systems in which a metallocene compound having a pentadienyl group (e.g., cyclopentadienyl group), an alkyl group and/or a halogen atom as a ligand is used in combination with aluminoxane are described in Japanese Patent Laid-Open Publications No. 19309/1983, No. 35006/1985, No. 35007/1985, No. 35008/1985, No. 130314/1986 and 41303/1990. Also described is that these catalyst systems are highly active in the polymerization of α-olefin.

Other than such catalyst systems using a metallocene compound and aluminoxane in combination as mentioned above, those using a metallocene compound and an organoboron compound in combination are known to show activities in the polymerization of α-olefin ("Macromolecules" 1993, 26, 3239; "J. Am. Chem. Soc." 1991, 113, 3623).

However, if an olefin is polymerized by the use of the catalyst systems stated above (catalyst systems using one kind of a transition metal compound), a polyolefin having an extremely narrow molecular weight distribution (Mw/Mn) of about 2 is produced. In this polyolefin, therefore, there are eagerly desired the improvement in moldability and in surface appearance of the molded articles.

To cope with those problems, processes for preparing polymers of a wide molecular weight distribution by the use of catalyst systems in which plural kinds of transition metal compounds and assisting catalyst components are used have been proposed and described in, for example, Japanese Patent 35006/1985, No. 35008/1985, No. 501369/1988, No. 283206/1992 and No. 230135/1993.

In these processes, however, polymers having different properties are produced from each transition metal compound catalyst components, so that the reaction process is intricate, and the molecular weight distribution of the resulting polymer is not always controlled easily. Therefore, in order to obtain a polymer of desired molecular weight distribution, complicated operations are required.

Accordingly, there is eagerly desired the advent of an olefin polymerization catalyst by the use of which a polymer having a wide molecular weight distribution can be obtained in spite of the catalyst system using one kind of a transition metal compound and an α-olefin can be polymerized with high polymerization activity. There is also desired the advent of a process for olefin polymerization using said olefin polymerization catalyst.

Moreover, the catalyst system in which the metallocene compound is combined with aluminoxane or the organoboron compound have been generally known to exhibit highest polymerization activity at a polymerization temperature of 60°–80° C. However, the molecular weight of polymers produced at such temperature is still insufficient for molding many kinds of products. While, in such case, the molecular weight of the polymer obtained can be improved by carrying out the polymerization at a temperature lower than the usual polymerization temperature, a sufficient polymerization activity cannot be obtained. Accordingly, there is eagerly desired the advent of an olefin polymerization catalyst which exhibits high polymerization activity at low polymerization temperature and can give polymers having high molecular weight, and a process for polymerizing olefin using said olefin polymerization catalyst.

The inventors have made extensive and intensive studies in order to cope with the above problems associated with the above prior art. In result, it has unexpectedly been found that these problems can be solved by using, in an olefin polymerization catalyst, a transition metal compound having at least two transition metals in one molecule, in which at least one of the transition metals bonds to a ligand having a cyclopentadienyl skeleton, at least one of the transition metal is selected from the group consisting of Sc, Y, Ti, Zr, Hf, V, Nb, Ta, Cr, Mo, W and lanthanoid metals, and one of the other is the specific transition metal selected from the same as or different from said metals.

OBJECT OF THE INVENTION

The present invention has been made in view of such prior art technique as mentioned above, and it is an object of the invention to provide an olefin polymerization catalyst by the use of which polyolefin having a broad molecular weight distribution can be obtained in spite of the catalyst system using one kind of a transition metal compound and aluminoxane or an organoboron compound, and which shows high polymerization activity.

It is another object of the invention to provide a process for olefin polymerization using such olefin polymerization catalyst.

It is a further object of the invention to provide an olefin polymerization catalyst which gives polymers having a high molecular weight and is excellent in the polymerization activity at low temperature, and a process for polymerizing olefin using said olefin polymerization catalyst.

SUMMARY OF THE INVENTION

The first olefin polymerization catalyst according to the invention comprises:

(A-1) a transition metal compound having at least two transition metals, in which at least one of the transition metals is bonded to at least one ligand having a cyclopentadienyl skeleton, said at least two metals being the same metals as each other and selected from Sc, Y, Ti, Zr, Hf, V, Nb, Ta, Cr, Mo, W and lanthanoid metals; and (B) an organoaluminum oxy-compound or an organoboron compound.

In the present invention, the transition metal compound (A-1) includes the transition metal compound represented by the following general formula [I]:

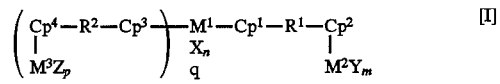

wherein $M^1$, $M^2$ and $M^3$ are the same metals as each other and are selected from Sc, Y, Ti, Zr, Hf, V, Nb, Ta, Cr, Mo, W and lanthanoid metals;

Cp¹, Cp² and Cp³ are each a group having a cyclopentadienyl skeleton, which may have a substituent, and the groups having a cyclopentadienyl skeleton may be the same as or different from each other;

R¹ and R² are each one bond group selected from an alkylene group, a substituted alkylene group, a silylene group, a substituted silylene group, a divalent tin-containing group and a divalent germanium-containing group, or a single bond, and the bonding groups are the same as or different from each other;

X, Y and Z are each a group selected from a hydrocarbon group, a nitrogen-containing group, an oxygen-containing group, a silicon-containing group, a phosphorus-containing group and a sulfur-containing group, or an atom selected from a halogen atom and a hydrogen atom, the groups or atoms indicated by X and Y may be the same as or different from each other, and a pair of X and Y, Y and Z, or Z and X may form a bond group selected from —O— and —S—, or may form a divalent bond group containing at least one atom selected from an oxygen atom, a nitrogen atom, a carbon atom, a silicon atom, a germanium atom, a phosphorus atom and a sulfur atom;

n is a integer of 1–5;

m is a integer of 1–5;

p is a integer of 1–5; and q is 0 or 1.

The transition metal compound of the general formula [I] be preferably a transition metal compound represented by the following formula [I']:

$$\begin{array}{c} Cp^1-R^1-Cp^2 \\ | \quad\quad\quad | \\ M^1X_n \quad M^2Y_m \end{array} \quad [I']$$

wherein M¹ and M² are the same metals as each other and are selected from Sc, Y, Ti, Zr, Hf, V, Nb, Ta, Cr, Mo, W and lanthanoid metals;

Cp¹ and Cp² are each a group having a cyclopentadienyl skeleton, which may have a substituent, and the groups having a cyclopentadienyl skeleton may be the same as or different from each other;

R¹ is one bond group selected from an alkylene group, a substituted alkylene group, a silylene group, a substituted silylene group, a divalent tin-containing group and a divalent germanium-containing group, or a single bond;

X and Y are each a group selected from a hydrocarbon group, a nitrogen-containing group, an oxygen-containing group, a silicon-containing group, a phosphorus-containing group and a sulfur-containing group, or an atom selected from a halogen atom and a hydrogen atom, the groups or atoms indicated by X and Y may be the same as or different from each other, and a pair of X and Y may form a bond group selected from —O— and —S—, or may form a divalent bond group containing at least one atom selected from an oxygen atom, a carbon atom, a silicon atom, a germanium atom, a phosphorus atom and a sulfur atom;

n is an integer of 1–5; and m is an integer of 1–5.

In the above formula [I'] of the transition metal compound used in the present invention, it is preferred that M¹ and M² are each one metal selected from Zr, Ti, Hf, V, Nb and Ta, and are the same as each other.

In the above formula [I'] representing the transition metal compound, it is preferred that:

M¹ and M² are each Zr, Ti or Hf;

R¹ is one bond group selected from an alkylene group, a substituted alkylene group, a silylene group, a substituted silylene group and a divalent germanium-containing group, or a single bond;

at least one of the groups indicated by X is a group having a cyclopentadienyl skeleton, which may have a substituent; and at least one of the groups indicated by Y is a group having a cyclopentadienyl skeleton, which may have a substituent.

In the above formula [I'] representing the transition metal compound, it is more preferred that:

M¹ and M² are each Zr or Ti;

R¹ is one bond group selected from an alkylene group, a substituted alkylene group, a silylene group, a substituted silylene group and a divalent germanium-containing group, or a single bond;

at least one of the groups indicated by X is a group having a cyclopentadienyl skeleton, which may have a substituent, while the others are halogen atoms; and at least one of the groups indicated by Y is a group having a cyclopentadienyl skeleton, which may have a substituent, while the others are halogen atoms.

The first process for olefin polymerization according to the invention comprises polymerizing an olefin in the presence of the above-mentioned olefin polymerization catalyst.

In the first olefin polymerization catalyst and the process for olefin polymerization stated above, the transition metal compound (A-1) as described above, is used as the transition metal compound component, so that polyolefin having a broad molecular weight distribution can be obtained. Moreover, the catalyst and the process are excellent in the polymerization activity.

The second olefin polymerization catalyst according to the invention comprises:

(A-2) a transition metal compound having at least two transition metals in which at least one metal is bonded at least one ligand having a cyclopentadienyl skeleton, said at least two metals being different from each other and each selected from Sc, Y, Ti, Zr, Hf, V, Nb, Ta, Cr, Mo, W and lanthanoid metals; and (B) an organoaluminum oxy-compound or an organoboron compound.

In the present invention, the transition metal compound (A-2) includes the transition metal compound represented by the following formula [II]:

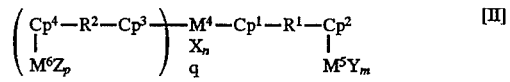

$$\left(\begin{array}{c} Cp^4-R^2-Cp^3 \\ | \\ M^6Z_p \end{array}\right)_q \begin{array}{c} M^4-Cp^1-R^1-Cp^2 \\ | \quad\quad\quad\quad\quad\quad | \\ X_n \quad\quad\quad\quad M^5Y_m \end{array} \quad [II]$$

wherein M⁴, M⁵ and M⁶ are each one metal selected from Sc, Y, Ti, Zr, Hf, V, Nb, Ta, Cr, Mo, W and lanthanoid metals, and at least two of M⁴, M⁵ and M⁶ are different from each other;

R¹ and R² are each a divalent group containing carbon atom, silicone atom, tin atom, germanium atom, phosphorous atom or sulfur atom or a single bond; and Cp¹, Cp², Cp³ and Cp⁴; X, Y and Z; n, m, p and q are the same as defined in the general formula [I].

The transition metal compound (A-2) preferably is a transition metal compound represented by the following formula [II']:

$$\begin{array}{c} Cp^1-R^1-Cp^2 \\ | \qquad | \\ M^4X_n \qquad M^5Y_m \end{array} \qquad [\text{II}']$$

wherein $M^4$ and $M^5$ are each one metal selected from Sc, Y, Ti, Zr, Hf, V, Nb, Ta, Cr, Mo, W and lanthanoid metals, and $M^4$ and $M^5$ are different from each other;

$R^1$ is a divalent group containing carbon atom, silicone atom, tin atom, germanium atom, phosphorous atom or sulfur atom, or a single bond; and $Cp^1$ and $Cp^2$; X, Y and Z; n and m are the same as defined in the general formula [I'].

In the above formula [II'] representing the transition metal compound (A-2), $M^4$ and $M^5$ are each preferably one metal selected from Zr, Ti, Hf, V, Nb and Ta, and different from each other.

In the above formula [II'] representing the transition metal compound, it is preferred that:

$M^4$ and $M^5$ are each one metal selected from Zr, Ti and Hf, and are different from each other;

$R^1$ is one bond group selected from an alkylene group, a substituted alkylene group, a silylene group, a substituted silylene group and a divalent germanium-containing group, or a single bond;

at least one of the groups indicated by X is a group having a cyclopentadienyl skeleton, which may have a substituent; and at least one of the groups indicated by Y is a group having a cyclopentadienyl skeleton, which may have a substituent.

In the above formula [II'] representing the transition metal compound, it is more preferred that:

$M^4$ is Zr, and $M^5$ is Ti;

$R^1$ is one bond group selected from an alkylene group, a substituted alkylene group, a silylene group, a substituted silylene group and a divalent germanium-containing group, or a single bond;

at least one of the groups indicated by X is a group having a cyclopentadienyl skeleton, which may have a substituent, while the others are halogen atoms; and at least one of the groups indicated by Y is a group having a cyclopentadienyl skeleton, which may have a substituent, while the others are halogen atoms.

The second process for olefin polymerization according to the invention comprises polymerizing an olefin in the presence of the above-mentioned olefin polymerization catalyst.

In the second olefin polymerization catalyst and the process for olefin polymerization stated above, the transition metal compound (A-2) as described above represented by the formula [II] is used as a transition metal compound component, so that polyolefin having a broad molecular weight distribution can be obtained. Moreover, the catalyst and the process are excellent in the polymerization activity.

The third olefin polymerization catalyst according to the invention comprises:

(A-3) a transition metal compound containing at least two transition metal in which at least one of said metals is bonded to at least one ligand having a cyclopentadienyl skeleton, said at least two metals comprising a transition metal selected from Zr, Ti, Hf, V, Nb, Ta, Cr, Mo, W and lanthanoid metals, and a transition metal selected from Mn, Tc, Re, Fe, Ru, Os, Co, Rh, It, Ni, Pd, Pt, Cu, Ag, Au, Zn, Cd and Hg; and (B) an organoaluminum oxy-compound or an organoboron compound.

In the present invention, the transition metal compound (A-3) includes the transition metal compound represented by the following formula [III]:

$$\begin{array}{c} Cp^4-R^2-Cp^3-M^7-Cp^1-R^1-Cp^2 \\ | \qquad\qquad | \qquad\qquad | \\ M^9Z_p \qquad\qquad X_n \qquad\qquad M^8Y_m \end{array} \qquad [\text{III}]$$

wherein $M^7$ is one metal selected from Sc, Y, Ti, Zr, Hf, V, Nb, Ta, Cr, Mo, W and lanthanoid metals, and $M^8$ is one metal selected from Mn, Tc, Re, Fe, Ru, Os, Co, Rh, Ir, Ni, Pd, Pt, Cu, Ag, Au, Zn, Cd and Hg;

$M^9$ is a transition metal;

$R^1$ and $R^2$ are each a divalent group containing carbon atom, silicone atom, tin atom, germanium atom, phosphorous atom or sulfur atom, or a single bond; and $Cp^1$, $Cp^2$, $Cp^3$ and $Cp^4$; X, Y and Z; m and p are the same as defined in the general formula [II]; and n is a integer of 1-4.

In the above formula [III] representing the transition metal compound, it is preferred $M^7$ is one metal selected from Ti, Zr, Hf, V, Nb and Ta, and $M^8$ and $M^9$ are the same as or different from each other and are selected from Mn, Re, Fe, Ru, Co, Rh, Ir, Ni and Pd.

In the above formula [III] representing the transition metal compound, it is preferred that:

$M^7$ is one metal selected from Zr, Ti and Hf, and $M^8$ and $M^9$ are the same as or different from each other and selected from Mn, Fe, Ru and Rh;

$R^1$ and $R^2$ are each one bond group selected from an alkylene group, a substituted alkylene group, a silylene group, a substituted silylene group and a divalent germanium-containing group, or a single bond, said groups being the same as or different from each other;

at least one of the groups indicated by Y is a group having a cyclopentadienyl skeleton, which may have a substituent; and at least one of the groups indicated by Z is a group having a cyclopentadienyl skeleton, which may have a substituent.

In the above formula [III] representing the transition metal compound, it is more preferred that:

$M^7$ is one metal selected from Zr, Ti and Hf, and $M^8$ and $M^9$ are Fe;

$R^1$ and $R^2$ are each one bond group selected from an alkylene group, a substituted alkylene group, a silylene group and a substituted silylene group, or a single bond said groups being the same as or different from each other;

the groups indicated by X are halogen;

at least one of the groups indicated by Y is a group having a cyclopentadienyl skeleton, which may have a substituent, while the others are halogen atoms; and at least one of the groups indicated by Z is a group having a cyclopentadienyl skeleton, which may have a substituent, while the others are halogen atoms.

In the present invention, the transition metal compound (A-3) also includes the transition metal compound represented by the following formula [III']:

$$\begin{array}{c} Cp^1-R^1-Cp^2 \\ | \qquad | \\ M^7X_n \qquad M^8Y_m \end{array} \qquad [\text{III}']$$

wherein $M^7$ is one metal selected from Sc, Y, Ti, Zr, Hf, V, Nb, Ta, Cr, Mo, W and lanthanoid metals, and $M^8$ is one metal selected from Mn, Tc, Re, Fe, Ru, Os, Co, Rh, Ir, Ni, Pd, Pt, Cu, Ag, Au, Zn, Cd and Hg;

$Cp^1$ and $Cp^2$; $R^1$; X and Y; n and m are the same as defined in the general formula [II'].

In the above formula [III'] representing the transition metal compound, it is preferred that $M^7$ is one metal selected from Ti, Zr, Hf, V, Nb and Ta, $M^8$ is selected from Mn, Re, Fe, Ru, Co, Rh, Ir, Ni and Pb.

In the above formula [III'] representing the transition metal compound, it is preferred that:

$M^7$ is one metal selected from Zr, Ti and Hf, and $M^8$ is one metal selected from Mn, Fe, Ru and Rh;

$R^1$ is one bond group selected from an alkylene group, a substituted alkylene group, a silylene group, a substituted silylene group and a divalent germanium-containing group, or a single bond;

at least one of the groups indicated by X is a group having a cyclopentadienyl skeleton, which may have a substituent; and at least one of the groups indicated by Y is a group having a cyclopentadienyl skeleton, which may have a substituent.

In the above formula [III'] representing the transition metal compound, it is more preferred that:

$M^7$ is selected from Zr, Ti and Hf, and $M^8$ is Fe;

$R^1$ is one bond group selected from an alkylene group, a substituted alkylene group, a silylene group and a substituted silylene group, or a single bond;

at least one of the groups indicated by X is a group having a cyclopentadienyl skeleton, which may have a substituent, while the others are halogen atoms; and at least one of the groups indicated by Y is a group having a cyclopentadienyl skeleton, which may have a substituent, while the others are halogen atoms.

The third process for olefin polymerization according to the invention comprises polymerizing an olefin in the presence of the above-mentioned olefin polymerization catalyst.

In the olefin polymerization catalyst and the process for olefin polymerization stated above, the transition metal compound represented by the formula [III] is used, so that the catalyst and the process are excellent in the polymerization activity at low temperature and thereby polyolefin having a high molecular weight can be obtained.

DETAILED DESCRIPTION OF THE INVENTION

Figure 1:
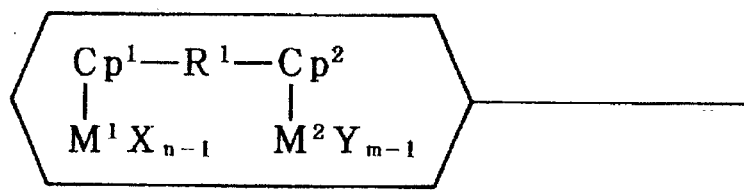
FIG. 1 is an explanatory view showing steps of a process for preparing the first olefin polymerization catalyst according to the invention.
Figure 2:
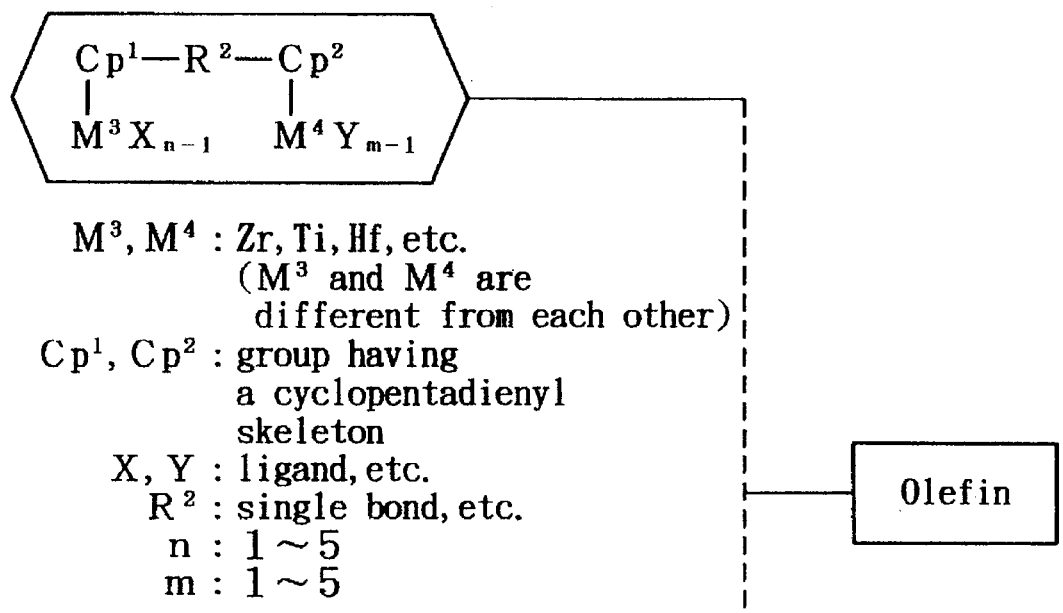
FIG. 2 is an explanatory view showing steps of a process for preparing the second olefin polymerization catalyst according to the invention.
Figure 2:
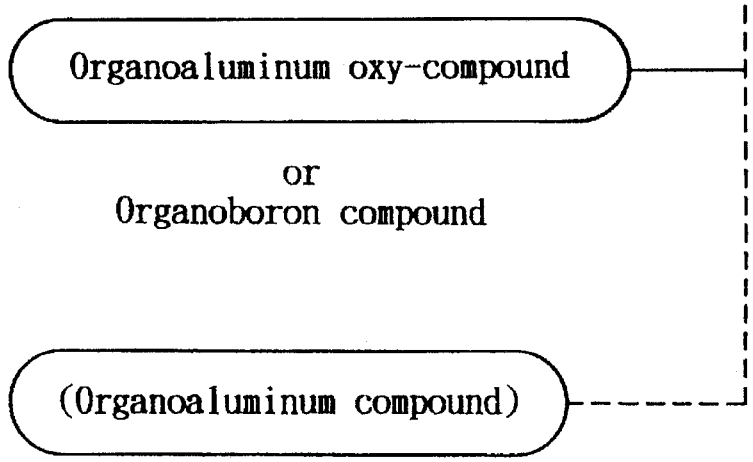
Figure 3:
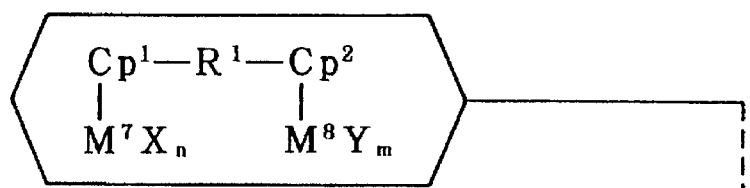
FIG. 3 is an explanatory view showing steps of a process for preparing the third olefin polymerization catalyst according to the invention.

The olefin polymerization catalyst and the process for olefin polymerization according to the invention will be described in detail hereinafter.

The meaning of the term "polymerization" used herein is not limited to "homopolymerization" but may comprehend "copolymerization". Also, the meaning of the term "polymer" used herein is not limited to "homopolymer" but may comprehend "copolymer".

The olefin polymerization catalyst according to the invention is formed from a transition metal compound (A-1), (A-2) or (A-3) containing at least two transition metal in which one of the two metals is bonded to one or more ligands having a cyclopentadienyl skeleton, at least one metal being a metal selected from Sc, Y, Ti, Zr, Hf, V, Nb, Ta, Cr, Mo, W and lanthanoid metals, and one of the others is the specific metal same as or different from said at least one metal, and (B) an organoaluminum oxy-compound or an organoboron compound.

Each components for forming the olefin polymerization catalyst of the invention are described below.

First, the transition metal compound (A-1) used in the invention is explained.

The transition metal compound (A-1) contains at least two transition metals, in which at least one of the transition metals is bonded to at least one ligand having a cyclopentadienyl skeleton, said at least two metals being the same metals selected from Sc, Y, Ti, Zr, Hf, V, Nb, Ta, Cr, Mo, W and lanthanoid metals.

The transition metal compound (A-1) includes, for example, the transition metal compound represented by the following formula [I].

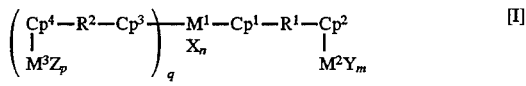

In the above formula, $M^1$, $M^2$ and $M^3$ are the same metals as each other and are each one metal selected from Sc, Y, Ti, Zr, Hf, V, Nb, Ta, Cr, Mo, W and lanthanoid metals, $Cp^1$, $Cp^2$, $Cp^3$ and $Cp^4$ are each a group having a cyclopentadienyl skeleton, the group having a cyclopentadienyl skeleton may have a substituent, and these groups having a cyclopentadienyl skeleton may be the same as or different from each other;

$R^1$ and $R^2$ are each one bond group selected from an alkylene group, a substituted alkylene group, a silylene group, a substituted silylene group, a divalent tin-containing group and a divalent germanium-containing group, or a single bond these groups may be the same as or different from each other;

X, Y and Z are each a group selected from a hydrocarbon group, a nitrogen-containing group, an oxygen-containing group, a silicon-containing group, a phosphorus-containing group and a sulfur-containing group, or an atom selected from a halogen atom and a hydrogen atom, and a pair of X and Y, a pair of Y and Z or a pair of X and Z may form a bond group selected from —O— and —S—, or may form a divalent bond group containing at least one atom selected from an oxygen atom, a nitrogen atom, a carbon atom, a silicon atom, a germanium atom, a phosphorus atom and a sulfur atom;

n is a integer of 1–5;

m is a integer of 1–5;

p is a integer of 1–5; and q is 0 or 1.

The transition metal compound of the above formula [I] preferably is the transition metal compound represented by the following formula [I'].

In the above formula, $M^1$ and $M^2$ are the same metals as each other and are each one metal selected from Sc, Y, Ti, Zr, Hf, V, Nb, Ta, Cr, Mo, W and lanthanoid metals. Of these, $M^1$ and $M^2$ are preferably Zr, Ti or Hf, more preferably Zr or Ti.

$Cp^1$ and $Cp^2$ are each a group having a cyclopentadienyl skeleton, and the group having a cyclopentadienyl skeleton may have a substituent. $Cp^1$ and $Cp^2$ may be the same as or different from each other.

Examples of the groups having a cyclopentadienyl skeleton include cyclopentadienyl groups, indenyl groups, tetrahydroindenyl groups and fluorene groups.

Examples of the substituents in the group having a cyclopentadienyl skeleton include hydrocarbon groups of 1 to 20 carbon atoms, perfluoroalkyl groups, alkoxy groups and halogen atoms.

Examples of the hydrocarbon groups of 1 to 20 carbon atoms include alkyl groups such as methyl, ethyl, propyl, butyl, hexyl, cyclohexyl, octyl, nonyl, dodecyl, icosyl, norbornyl and adamantyl; alkenyl groups such as vinyl, propenyl and cyclohexenyl; arylalkyl groups such as benzyl, phenylethyl and phenylpropyl; and aryl groups such as phenyl, tolyl, dimethylphenyl, trimethylphenyl, ethylphenyl, propylphenyl, biphenyl, naphthyl, methylnaphthyl, anthracenyl and phenanthryl.

Examples of the perfluoroalkyl groups include trifluoromethyl and nonafluorobutyl.

Examples of the alkoxy groups include methoxy, ethoxy propoxy and butoxy.

Examples of the halogen atoms include fluorine, chlorine, bromide and iodine.

The hydrocarbon groups may be mutually bonded to form a ring, and this ring may have a double bond.

Examples of the groups having a cyclopentadienyl skeleton include cyclopentadienyl groups; alkyl substituted cyclopentadienyl groups such as methylcyclopentadienyl, ethylcyclopentadienyl, n-butylcyclopentadienyl, dimethylcyclopentadienyl, trimethylcyclopentadienyl and pentamethylcyclopentadienyl; indenyl groups; fluorenyl groups; alkyl substituted indenyl groups; and alkyl substituted fluorenyl groups.

Of these, $Cp^1$ and $Cp^2$ are each preferably a cyclopentadienyl group.

$R^1$ is one bond group selected from an alkylene group, a substituted alkylene group, a silylene group, a substituted silylene group, a divalent tin-containing group and a divalent germanium-containing group, or a single bond. These bonding group may contain a hetero-atom such as oxygen atom, nitrogen atom, sulfur atom and phosphorus atom.

More specifically, examples of the bond groups include:
alkylene groups, such as ethylene and propylene;
substituted alkylene groups, such as isopropylidene and diphenylmethylene;
substituted silylene groups, such as dimethylsilylene, diethylsilylene and methylphenylsilylene;
divalent tin-containing groups obtained by replacing silicon in the above substituted silylene groups with tin; and
divalent germanium-containing groups obtained by replacing silicon in the above substituted silylene groups with germanium.

Of these, preferred is one bond group selected from an alkylene group, a substituted alkylene group, a silylene group, a substituted silylene group and a divalent germanium-containing group, or a single bond.

X and Y are each a group selected from a hydrocarbon group, a nitrogen-containing group, an oxygen-containing group, a silicon-containing group, a phosphorus-containing group and a sulfur-containing group, or an atom selected from a halogen atom and a hydrogen atom.

In more detail, there can be mentioned the same hydrocarbon groups of 1 to 20 carbon atoms as described previously and the same groups having a cyclopentadienyl skeleton as described previously with respect to $Cp^1$ and $Cp^2$ ethylene acetylene, butadiene, allyl, cyclooctadienyl (COD), norborninadienyl, cyclooctatetraenyl and pentadienyl.

Examples of the nitrogen-containing group, oxygen-containing group, silicon-containing group, phosphorus-containing group and sulfur-containing group include groups represented by $—NR^a{}_3$, $—NR^a{}_2$, $—NO$, $—NO_2$, $—CN$, $—SCN$, $—OR^a$, $—OCOR^a$, $CO$, $—C(O)R^a$, $—OSiR^a{}_3$, $—CH_2SiR^a{}_3$, $—PR^a{}_3$, $—P(OR^a)_3$, $—SR^a$, $—SOR^a$, $—SO_2R^a$ and $—OSO_2R^a$ ($R^a$ is hydrogen, hydrocarbon group of 1 to 20 carbon atoms or a group obtained by substituting some of hydrogen atoms in the hydrocarbon group with hetero atom(s)).

More specifically, there can be mentioned $—N(C_2H_5)_3$, $—N(C_2H_5)_2$, pyrrole, pyridine, $—OCH_3$, $—O—tert—C_4H_9$, $—OPh$, $—OCOPh$, $—C(O)CH_3$, $—OSi(CH_3)_2$, $—CH_2Si(CH_3)_3$, $—P(CH_3)_3$, $—P(C_4H_9)_3$, $—PPh_3$, $—P(CH_3)_2Ph$, $—P(CH_3)\ ph_2$, $—P(O—C_2H_5)_3$, $—P(O—iso—C_3H_7)_3$, $—OSO_2PhCH_3$ and $—OSO_2CF_3$ s (Ph is phenyl).

Examples of the halogen atoms are identical with those previously described.

The group indicated by X and the group indicated by Y may be bonded through the same groups as exemplified with respect to $R^1$, or may be bonded directly.

When plural groups indicated by X are present, they may be the same as or different from each other. When plural groups indicated by Y are present, they may be the same as or different from each other. Further, the group indicated by X and the group indicated by Y may be the same as or different from each other.

When plural groups indicated by X are present, it is preferred that at least one of those groups is a group having a cyclopentadienyl skeleton, which may have a substituent; and it is more preferred that at least one of those groups indicated by X is a group having a cyclopentadienyl skeleton, which may have a substituent, and the others are halogen atoms.

When plural groups indicated by Y are present, it is preferred that at least one of those groups is a group having cyclopentadienyl, which may have a substituent; and it is more preferred that at least one of those groups indicated by Y is a group having cyclopentadienyl, which may have a substituent, and the others are halogen atoms.

A pair of X and Y may form a bond group selected from $—O—$ and $—S—$, or may form a divalent bond group containing at least one atom selected from an oxygen atom, a carbon atom, a silicon atom, a germanium atom, a phosphorus atom and a sulfur atom.

Examples of the divalent bond groups containing at least one atom selected from an oxygen atom, a carbon atom, a silicon atom, a germanium atom, a phosphorus atom and a sulfur atom include:
bond groups, such as $—CO—$, $—SO—$, $—SO_2$, and $—(R^a)—O—(R^a)—$ ($R^a$ is the same as defined above);
divalent bond groups containing a silicon atom, such as the same silylene groups and substituted silylene groups as described previously; and
divalent bond groups containing a germanium atom, which are obtained by replacing silicon in the above-mentioned substituted silylene groups with germanium.

n is a integer of 1–5, preferably of 1–3.

m is a integer of 1–5, preferably of 1–3.

$Cp^1$ and X, or $Cp^2$ and Y may be bonded through the same bond groups as exemplified with respect to $R^1$, or may be bonded directly. $Cp^1$ and $Cp^2$ may be further bonded through the same bond groups as exemplified with respect to $R^1$, in addition to $R^1$. However, it is undesirable that $R^1$ and X are bonded through other groups than $Cp^1$, and it is also undesirable that $R^1$ and Y are bonded through other groups than $Cp^2$.

Enumerated below are examples of the transition metal compounds represented by the formula [I]. In the following structural formulas, Cp means a cyclopentadienyl group.

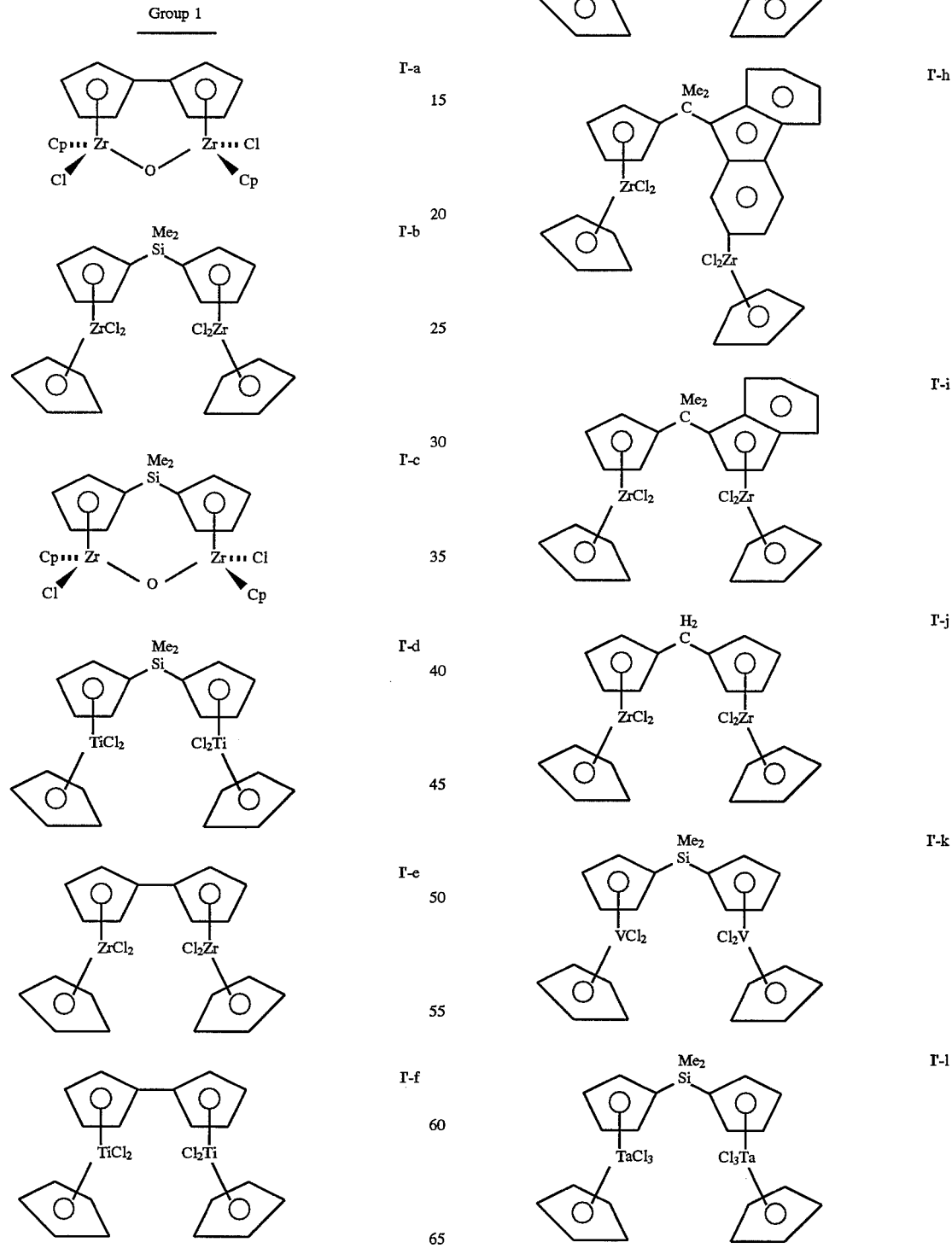

-continued

Group 1

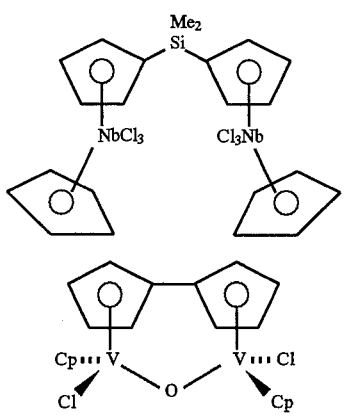

The transition metal compound represented by the formula [I'] can be prepared by, for example, bringing a compound represented by the following formula (i), a compound represented by the following formula (ii) and a compound represented by the following formula (iii) into contact with each other in a solvent.

Further, the transition metal compound can be also prepared by stepwise conducting the reactions among the compound of the formula (i), the compound of the formula (ii) and the compound of the formula (iii), or by reacting the compound of the formula (i) with the compound of the formula (ii) in a solvent and then adding the compound of the formula (iii) to the solvent. In this case, the compound of the formula (ii) and the compound of the (iii) may be the same as each other.

$$[Cp^1—R^1—Cp^2]A_p \quad (i)$$

wherein $Cp^1$, $Cp^2$ and $R^1$ have the same meanings as defined in the formula [I']; A is an alkali metal (e.g., lithium, sodium, potassium), thallium, aluminum, dimethylstanylene group, dimethylsilylene group or the like; p is 1 or 2.

$$Z^1—M^PX_{n-1} \quad (ii)$$

wherein $M^P$ have the same meanings as that of $M^1$ in the general formula [I'], X and n have the same meanings as defined in the formula [I'], and $Z^1$ is a halogen atom.

$$Z^2—M^QY_{m-1} \quad (iii)$$

wherein $M^Q$ have the same meanings as that of $M^2$ in the general formula [I'], Y and m have the same meanings as defined in the formula [I'], and $Z^2$ is a halogen atom.

X and Y in the transition metal compound of the formula [I'] obtained as above can be exchanged by a ligand exchange reaction which is conventionally known.

The transition metal compound represented by the formula [I'] can be also prepared by contacting a compound represented by the following formula (iv) with a compound represented by the following formula (v) in a solvent.

$$\begin{array}{c} Cp^1—B \\ | \\ M^PX_{n-1} \end{array} \quad (iv)$$

$$\begin{array}{c} C—Cp^2 \\ | \\ M^QY_{m-1} \end{array} \quad (v)$$

In the above formulas, $M^P$ and $M^Q$ have the same meanings as those of $M^1$ and $M^2$ in the general formula [I'], respectively; $Cp^1$, $Cp^2$, X, Y, n and m have the same meanings as defined in the formula [I'], and B and C are such substituents as are reacted with each other to produce $R^1$ defined in the formula [I'].

Furthermore, the transition metal compound can be also prepared by stepwise conducting the reactions among the compound of the above formula (iv), a compound of the following formula (vi) and the compound of the above formula (iii), or by reacting the compound of the above formula (iv) with the compound of the following formula (vi) to form the $Cp^1$—$R^1$—$Cp^2$ portion and then contacting it with the compound of the formula (iii) in a solvent.

$$E—Cp^2 \quad (vi)$$

wherein $Cp^2$ has the same meaning as defined in the formula [I'], E is such a substituent as is reacted with B in the above formula (iii) to produce $R^1$ defined in the formula [I'].

These reactions are known in "Organometallics" 1987, 6, 897; "Organometallics" 1990, 9, 2142; "Organometallics" 1989, 8, 2107, "Organometallics" 1992, 11, 3942; "J. Organomet. Chem." 1990, 383, 227; "SYNLETT" 1990 493, etc.

Next, the transition metal compound (A-2) used in the invention is explained.

The transition metal compound (A-2) is a transition metal compound having at least two transition metals in which at least one metal is bonded to at least one ligand having a cyclopentadienyl skeleton, said at least two metals are a metal selected from Zr, Ti, Hf, V, Nb, Ta, Cr, Mo, W and lanthanoid metals and are different from each other.

The transition metal compound (A-2) is, for example, a compound represented by the following formula [II]:

$$\left( \begin{array}{c} Cp^4—R^2—Cp^3 \\ | \\ M^6Z_p \end{array} \right)—\begin{array}{c} M^4—Cp^1—R^1—Cp^2 \\ | \\ X_n \\ q \end{array} \begin{array}{c} \\ | \\ M^5Y_m \end{array} \quad [II]$$

Wherein $M^4$, $M^5$ and $M^6$ are each one metal selected from Sc, Y, Ti, Zr, Ti, Hf, V, Nb, Ta, Cr, Mo, W and lanthanoid metals, and at least two of $M^4$, $M^5$ and $M^6$ are different from each other;

$R^1$ and $R^2$ are each a divalent group containing carbon atom, silicone atom, tin atom, germanium atom, phosphorous atom or sulfur atom, or a single bond; and $Cp^1$, $Cp^2$, $Cp^3$ and $Cp^4$; X, Y and Z; n, m, p and q are the same as defined in the general formula [I].

The transition metal compound (A-2) represented by the formula [II] preferably is a compound represented by the following formula [II'].

$$\begin{array}{cc} Cp^1—R^1—Cp^2 \\ | & | \\ M^4X_n & M^5Y_m \end{array} \quad [II']$$

In the above formula, $M^4$ and $M^5$ is each one metal selected from Sc, Y, Ti, Zr, Hf, V, Nb, Ta, Cr, Mo, W and lanthanoid metals.

Among then, preferred for each of $M^4$ and $M^5$ is one metal selected from Zr, Ti, Hf, V, Nb and Ta; particularly from Zr, Ti and Hf. It is most preferred that $M^4$ is Zr and $M^5$ is Ti.

$Cp^1$ and $Cp^2$ are each the same group having a cyclopentadienyl skeleton as described for $Cp^1$ and $Cp^2$. $Cp^3$ and $Cp^4$ may be the same as or different from each other.

Of the groups having a cyclopentadienyl group, which are previously exemplified in the formula [I'], a cyclopentadienyl group is preferable as $Cp^3$ and $Cp^4$.

$R^1$ is the same bond group as described for $R^1$, or a single bond in the formula [II].

Of the groups and single bond exemplified previously, $R^1$ is preferably one bond group selected from an alkylene group, a substituted alkylene group, a silylene group, a substituted silylene group and a divalent germanium-containing group, or a single bond.

X and Y are each the same group or the same atom as described for X and Y in the general formula [I']. When plural groups indicated by X are present, it is preferred that at least one of those groups is a group having a cyclopentadienyl skeleton, which may have a substituent; and it is more preferred that at least one of those groups is a group having a cyclopentadienyl skeleton, which may have a substituent, and the others are halogen atoms.

When plural groups indicated by Y are present, it is preferred that at least one of those groups is a group having a cyclopentadienyl skeleton, which may have a substituent; and it is more preferred that at least one of those groups is a group having a cyclopentadienyl skeleton, which may have a substituent, and the others are halogen atoms.

n and m are the same as defined in the general formula [I'], and are each preferably an integer 1–3.

Enumerated below are examples of the transition metal compounds represented by the formula [II]. In the following structural formulas, Cp means a cyclopentadienyl group.

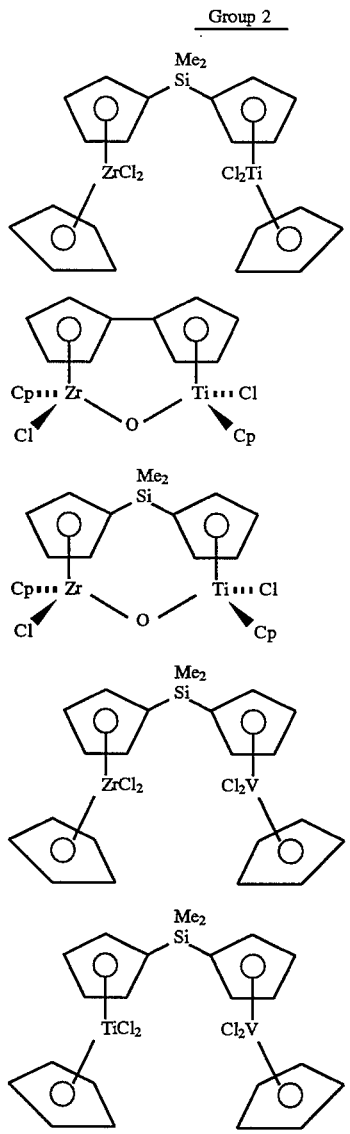

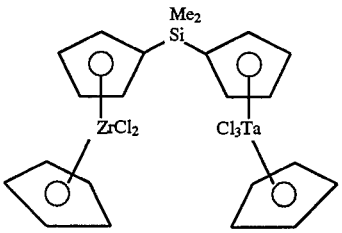

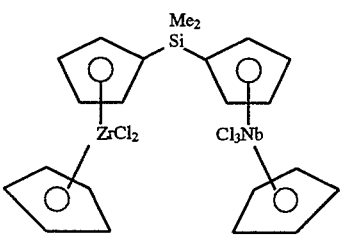

The transition metal compound (A-2) represented by the formula [II'] can be prepared by the same manner as described for the transition metal compound represented by the formula [I'] with using the following compounds;

the compound represented by the above formula (i);

the compound represented by the above formula (ii), provided that $M^P$ in the formula (ii) is defined as same as $M^4$ in the formula [II'];

the compound represented by the above formula (iii), provided that $M^Q$ in the formula (iii) is defined as same as $M^5$ in the formula [II'];

the compound represented by the above formula (iv), provided that $M^P$ in the formula (iii) is defined as same as $M^4$ in the formula [II'];

the compound represented by the above formula (v), provided that $M^Q$ in the formula (iv) is defined as same as $M^5$ in the formula [II']; and the compound represented by the formula (vi).

Furthermore, the transition metal compound can be also prepared by stepwise conducting the reactions among the compound of the above formula (v), a compound of the following formula (vi') and the compound of the above formula (ii), or by reacting the compound of the above formula (v) with the compound of the following formula (vi') to form the $Cp^3$—$R^2$—$Cp^4$ portion and then contacting it with the compound of the formula (ii) in a solvent.

$$F—Cp^1 \quad \text{(vi')}$$

wherein $Cp^1$ has the same meaning as defined in the formula [I'], F is such a substituent as is reacted with C in the above formula (v) to produce $R^2$ defined in the formula [I'].

These reactions are also known in the references mentined above, which describe the process for preparing the transition metal compounds by the formula [I']. represented Next, the transition metal compound (A-3) used in the invention is explained.

The transition metal compound (A-3) is a transition metal compound having at least two transition metals in which at least one metal is bonded to at least one ligand having a cyclopentadienyl skeleton, said at least two metals comprises at least one metal selected from Sc, Y, Ti, Zr, Hf, V, Nb, Ta, Cr, Mo, W and lanthanoid metals, and at least one metal selected from Mn, Tc, Re, Fe, Ru, Os, Co, Rh, Ir, Ni, Pd, Pt, Cu, Ag, Au, Zn, Cd and Hg.

The transition metal compound (A-3) is, for example, a compound represented by the following formula [III].

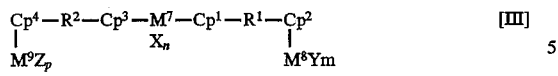

In the above formula, $M^7$ is one metal selected from Sc, Y, Ti, Zr, Ti, Hf, V, Nb, Ta, Cr, Mo, W and lanthanoid metals. Preferably one metal selected from Zr, Ti and Hf.

$M^8$ is one metal selected from Mn, Tc, Re, Fe, Ru, Os, Co, Rh, Ir, Ni, Pd, Pt, Cu, Ag, Au, Zn, Cd, Hg.

$M^9$ is a transition metal, more concretely, is one kind of metal selected from the same transition metals as $M^7$ and $M^8$. $M^7$ and $M^9$, or $M^8$ and $M^9$ are the same as or different from each other.

In the present invention, it is preferred that $M^7$ is a transition metal selected from Ti, Zr, Hf, V, Nb and Ta, $M^8$ and $M^9$ are transition metals as same as or different from each other, and each selected from Mn, Re, Fe, Ru, Co, Rh, Ir, Ni and Pd.

It is particularly preferred that $M^7$ is one metal selected from Zr, Ti and Hf, and $M^8$ and $M^9$ are the same as or different from each other and each selected from Mn, Fe, Ru and Rh; and it is most preferred that $M^7$ is Zr, $M^8$ and $M^9$ are each Fe.

$Cp^1$, $Cp^2$, $Cp^3$ and $Cp^4$ are each the same group having a cyclopentadienyl skeleton as described for $Cp^1$ and $Cp^2$ in the formula [I'], and, therefore, may have a substituent and may be the same as or different from each other.

Of the groups previously exemplified, a cyclopentadienyl group is preferable as $Cp^1$, $Cp^2$, $Cp^3$ and $Cp^4$.

$R^1$, and $R^2$ are each the same bond group as described for $R^1$ and $R^2$ in the formula [II], and may be the same as or different from each other. $R^1$ and $R^2$ are preferably each one bond group selected from an alkylene group, a substituted alkylene group, a silylene group, a substituted silylene group and a divalent germanium-containing group, or a single bond.

X, Y and Z are each the same group or the same atom as described for X, Y and Z in the formula [I].

When plural groups indicated by X are present, they may be the same as or different from each other. When plural groups indicated by Y are present, they may be the same as or different from each other. When plural groups indicated by Z are present, they may be the same as or different from each other. Further, the group indicated by X, the group indicated by Y and the group indicated by Z may be the same as or different from each other.

The group indicated by X is preferably halogen atom.

If plural groups indicated by Y are present, it is preferred that at least one of those groups is a group having a cyclopentadienyl skeleton, which may have a substituent; and it is more preferred that at least one of those groups is a group having a cyclopentadienyl skeleton, which may have a substituent, and the others are halogen atoms.

If plural groups indicated by Z are present, it is preferred that at least one of those groups is a group having a cyclopentadienyl skeleton, which may have a substituent; and it is more preferred that at least one of those groups is a group having a cyclopentadienyl skeleton, which may have a substituent, and the others are halogen atoms.

n is an integer of 1–4, preferably of 1–2.

m and p are each an integer of 1–5, preferably of 1–3.

Enumerated below are examples of the transition metal compounds (A-3) represented by the formula [III]. In the following structural formulas, Cp means a cyclopentadienyl group.

Group 3

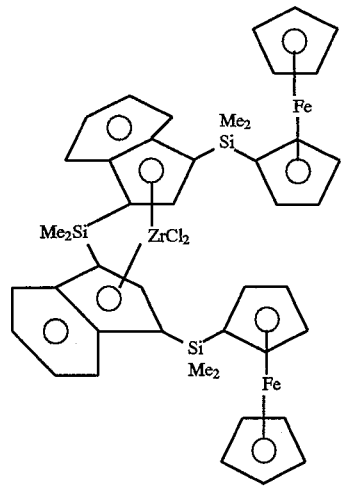

III-a

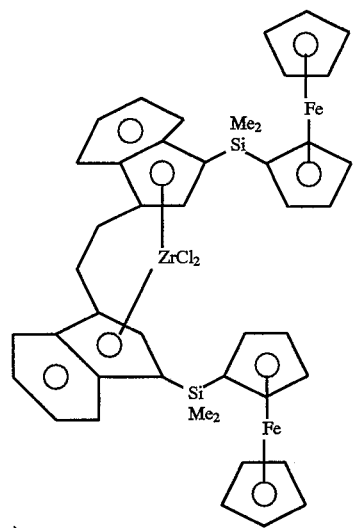

III-b

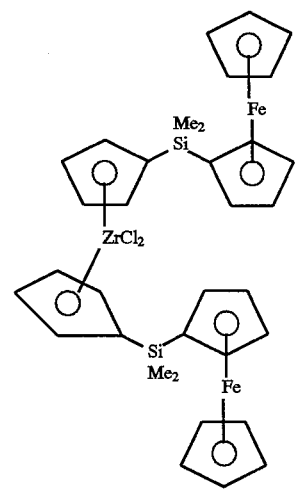

III-c

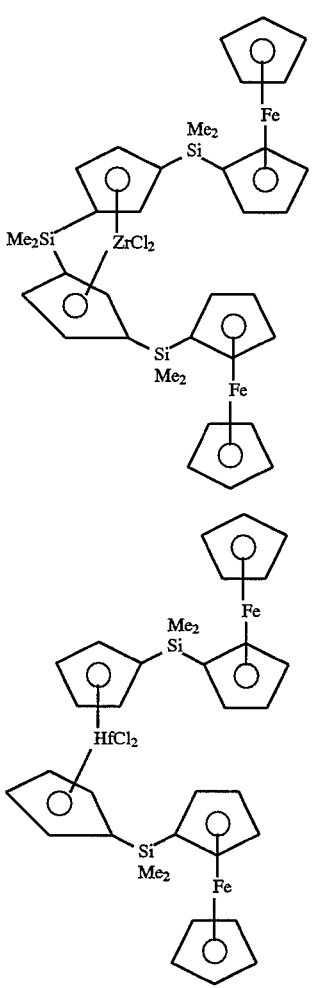

The transition metal compound (A-3) also includes a compound represented by the following formula [III'].

$$\begin{array}{c} Cp^1-R^1-Cp^2 \\ | \quad \quad | \\ M^7X_n \quad M^8Y_m \end{array} \quad [III']$$

In the above formula, $M^7$ and $M^8$ are the same as defined in the formula [III].

In the present invention, it is preferred that $M^7$ is one transition metal selected from Ti, Zr, Hf, V, Nb and Ta, $M^8$ is one transition metal selected from Mn, Re, Fe, Ru, Co, Rh, Ir, Ni and Pd. It is particularly preferred that $M^7$ is a metal selected from Ti, Zr and Hf, and $M^8$ is selected from Mn, Fe, Ru and Rh; and it is most preferred that $M^7$ is Ti, Zr or Hf, and $M^8$ is Fe.

$Cp^1$ and $Cp^2$ are the same as defined in the formula [III]. $Cp^1$ and $Cp^2$ may be the same as or different from each other.

Of the groups previously exemplified, a cyclopentadienyl group is preferable as $Cp^1$ and $Cp^2$.

$R^1$ is the same as $R^1$ and $R^2$ defined in the formula [III]. Of the groups and single bond exemplified previously, $R^1$ is preferably one bond group selected from an alkylene group, a substituted alkylene group, a silylene group, a substituted silylene group and a divalent germanium-containing group, or a single bond.

X and Y are each the same as $R^1$ and $R^2$ defined in the formula [III].

The group indicated by X and the group indicated by Y may be bonded through the same bond groups as exemplified with respect to $R^1$, or may be directly bonded.

If plural groups indicated by X are present, they may be the same as or different from each other. If plural groups indicated by Y are present, they may be the same as or different from each other. Further, the group indicated by X and the group indicated by Y may be the same as or different from each other.

If plural groups indicated by X are present, it is preferred that at least one of those groups is a group having a cyclopentadienyl skeleton, which may have a substituent; and it is more preferred that at least one of those groups is a group having a cyclopentadienyl skeleton, which may have a substituent, and the others are halogen atoms.

If plural groups indicated by Y are present, it is preferred that at least one of those groups is a group having a cyclopentadienyl skeleton, which may have a substituent; and it is more preferred that at least one of those groups is a group having a cyclopentadienyl skeleton, which may have a substituent, and the other are halogen atoms.

n and m are each an integer of 1–5, preferably of 1–3.

Enumerated below are examples of the transition metal compounds represented by the formula [III']. In the following structural formulas, Cp means a cyclopentadienyl group.

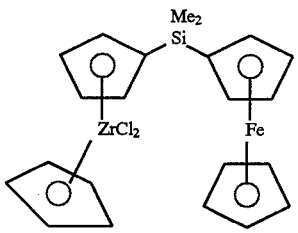

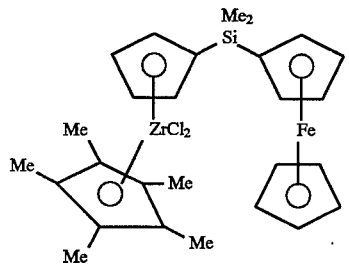

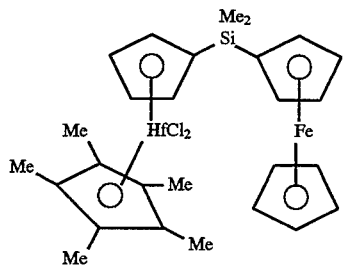

Group 4 -continued

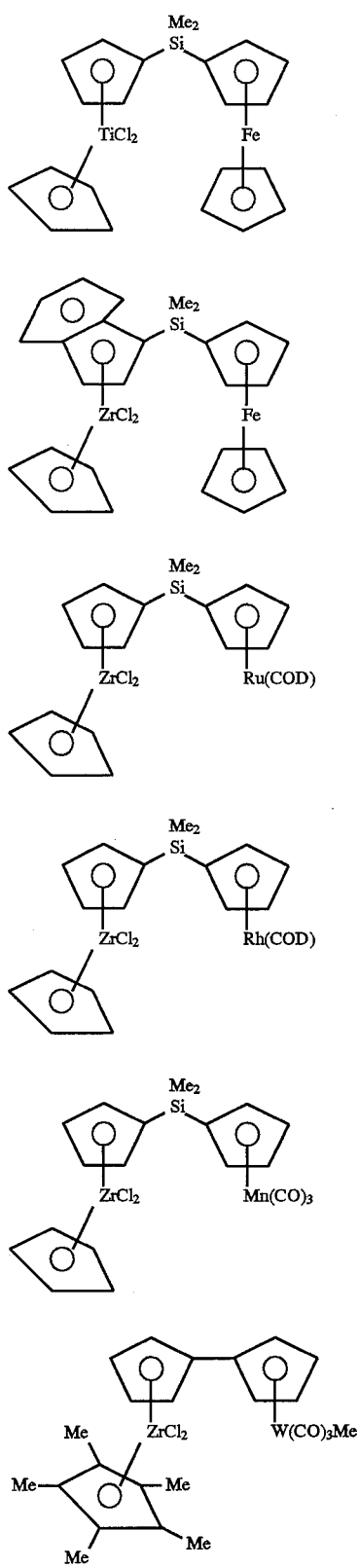

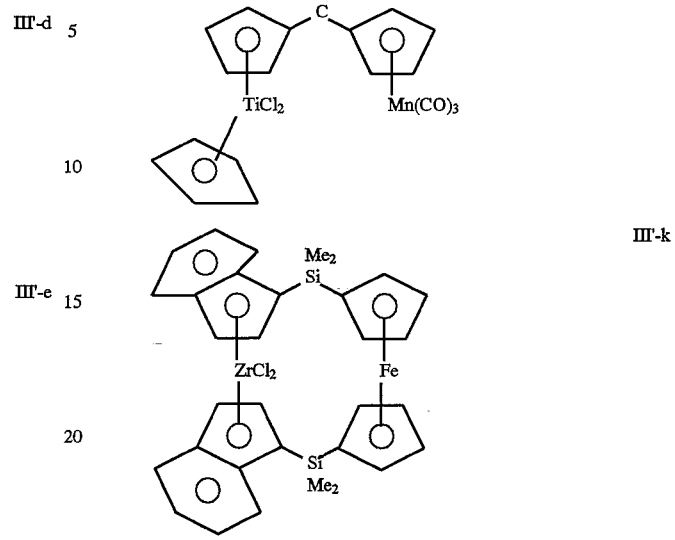

The transition metal compound (A-3) represented by the formula [III] or [III'] can be prepared by the same manner as described for the transition metal compound represented by the formula [II'] with using the following compounds;

the compound represented by the above formula (i);

the compound represented by the above formula (ii), provided that $M^P$ in the formula (ii) is defended as same as $M^7$ in the formula [III] or [III'];

the compound represented by the above formula (iii), provided that $M^Q$ in the formula (iii) is defined as same as $M^8$ in the formula [III] or [III'];

the compound represented by the above formula (iv), provided that $M^P$ in the formula (ii) is defended as same as $M^7$ in the formula [III] or [III'];

the compound represented by the above formula (v), provided that $M^Q$ in the formula (iii) is defined as same as $M^8$ in the formula [III] or [III']; and the compound represented by the formula (vi).

The reactions are also known in the references describing the processes for preparing the transition metal compounds represented by the formula [I'].

Next, the organoaluminum oxy-compound (B) used together with the transition metal compound (A-1), (A-2) or (A-3) in the olefin polymerization catalyst of the invention is explained.

The organoaluminum oxy-compound (B) may be either aluminoxane conventionally known or such a benzene-insoluble organoaluminum oxy-compound as disclosed in Japanese Patent Laid-Open Publication No. 78687/1990.

The conventionally known aluminoxane can be prepared by, for example, the following procedures.

(1) A procedure of adding an organoaluminum compound such as trialkylaluminum to a hydrocarbon medium suspension of compounds containing adsorbed water or salts containing water of crystallization, e.g., magnesium chloride hydrate, copper sulfate hydrate, aluminum sulfate hydrate, nickel sulfate hydrate and cerous chloride hydrate, so as to allow the organoaluminum compound to react with the adsorbed water or the water of crystallization.

(2) A procedure of allowing water, ice or water vapor to directly act on an organoaluminum compound such as trialkylaluminum in a medium such as benzene, toluene, ethyl ether or tetrahydrofuran.

(3) A procedure of causing organotin oxide such as dimethyltin oxide or dibutyltin oxide to react with an organoaluminum compound such as trialkylaluminum in a medium such as decane, benzene or toluene.

The aluminoxane may contain a small amount of an oraganometallic component. Further, it is possible that the solvent or the unreacted organoaluminum compound is distilled off from the solution after recovery of aluminoxane and the residue is dissolved again in a solvent.

Examples of the organoaluminum compounds for use in the preparation of aluminoxane include:

trialkylaluminums, such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum;

tricycloalkylaluminums, such as tricyclohexylaluminum and tricyclooctylaluminum;

dialkylaluminum halides, such as dimethylaluminum chloride, diethylaluminum chloride, diethylaluminum bromide and diisobutylaluminum chloride;

dialkylaluminum hydrides, such as diethylaluminum hydride and diisobutylaluminum hydride;

dialkylaluminum alkoxides, such as diethylaluminum methoxide and diethylaluminum ethoxide; and dialkylaluminum aryloxides, such as diethylaluminum phenoxide.

Of these, preferred are trialkylaluminum and tricycloalkylaluminum, and particularly preferred is trialkylaluminum.

Also employable as the organoaluminum compound is isoprenylaluminum represented by the following formula [IX]:

$$(i\text{-}C_4H_9)_xAl_y(C_5H_{10})_z \qquad [IX]$$

wherein x, y and z are each a positive number, and $z \geq 2x$.

The organoaluminum compounds stated above are employed singly or in combination.

Examples of the solvents used for preparing aluminoxane include aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cyclopentane, cyclohexane, cyclooctane and methylcyclopentane; petroleum fractions such as gasoline, kerosine and gas oil; and halides of the aromatic, aliphatic and alicyclic hydrocarbons as described above, particularly chlorides and bromides thereof. Also employable are ethers such as ethyl ether and tetrahydrofuran. Of these solvents, preferred are aromatic hydrocarbons.

The benzene-insoluble organoaluminum oxy-compound employable in the invention can be obtained by contacting aluminoxane with water or an active hydrogen-containing compound or contacting the above-mentioned organoaluminum compound with water. The benzene-insoluble organoaluminum oxy-compound contains an Al component which is soluble in benzene at 60° C. in an amount of not more than 10%, preferably not more than 5%, particularly preferably not more than 2%, in terms of Al atom, and is insoluble or sparingly soluble in benzene.

Generally, the organoaluminum oxy-compound (B) is on the market or handled in the form of a toluene solution.

The organoaluminum oxy-compound (B) used in the invention may contain organic compounds of other metals than aluminum in small amounts.

Next, the organoboron compound (B) used together with the transition metal compound (A-1), (A-2) or (A-3) in the olefin polymerization catalyst of the invention is explained.

Examples of the organoboron compounds used in the invention include trialkylboranes, triarylboranes, trihalogenboranes, anion salts of tetraalkylboranes, salts of tetraarylboranes and salts of tetrahalogenboranes. The alkyl group and the aryl group in these organoboron compounds may have one or more substituents.

In more detail, examples of the organoboron compounds include triphenylborane, tris (pentafluorophenyl)borane, triphenylcarboniumtetrakis (pentafluorophenyl)borane, diphenylcarboniumtetrakis (pentafluorophenyl)borane, cycloheptatrieniumtetrakis (pentafluorophenyl)borane, tributylammoniumtetrakis (pentafluorophenyl)borane and dimethylaniliniumtetrakis (pentafluorophenyl)borane.

The olefin polymerization catalyst formed from the organoaluminum oxy-compound or organoboron compound (B) mentioned above and the transition metal compound (A-1) or (A-2) previously mentioned is excellent in the olefin polymerization activity, and the resulting olefin polymer has a wide molecular weight distribution (Mw/Mn).

The olefin polymerization catalyst formed from the organoaluminum oxy-compound or organoboron compound (B) mentioned above and the transition metal compound (A-3) previously mentioned gives polymers having high molecular weight and is excellent in the olefin polymerization activity at a low temperature.

The transition metal compound (A-1), (A-2) or (A-3) and/or the organoaluminum oxy-compound or organoboron compound (B) may be supported on a carrier.

The first to third olefin polymerization catalysts of the invention is formed from the transition metal compound (A-1), (A-2) or (A-3); and the organoaluminum oxy-compound or the organoboron compound (B), but the catalyst may contain, in addition thereto, an organoaluminum compound (C) if necessary.

The organoaluminum compound (C) is, for example, an organoaluminum compound represented by the following formula [X]:

$$R^d_n AlX_{3-n} \qquad [X]$$

wherein $R^d$ is a hydrocarbon group of 1 to 12 carbon atoms, X is a halogen atom or a hydrogen atom, and n is 1 to 3.

In the above formula [X], $R^d$ is a hydrocarbon group of 1 to 12 carbon atoms, e.g., an alkyl group, a cycloalkyl group or an aryl group. More specifically, examples of those groups include methyl, ethyl, n-propyl, isopropyl, isobutyl, pentyl, hexyl, octyl, cyclopentyl, cyclohexyl, phenyl and tolyl.

Examples of the organoaluminum compounds (C) include:

trialkylaluminums, such as trimethylaluminum, triethylaluminum, triisopropylaluminum, triisobutylaluminum, trioctylaluminum and tri-2-ethylhexylaluminum;

alkenylaluminums, such as isoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichloride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compound (C) is a compound represented by the following formula [XI]:

$$R^d_n AlW_{3-n} \quad [XI]$$

wherein $R^d$ is the same group as described above; W is $-OR^e$, $-OSiR^f_3$, $-OAlR^g_2$, $-NR^h_2$, $-SiR^i_3$ or $-N(Rj)AlR^k_2$; n is 1 or 2;

$R^e$, $R^f$, $R^g$ and $R^k$ are each methyl, ethyl, isopropyl, isobutyl, cyclohexyl, phenyl or the like; $R^h$ is hydrogen, methyl, ethyl, isopropyl, phenyl, trimethylsilyl or the like; and $R^i$ and $R^j$ are each methyl, ethyl or the like.

Listed below are examples of the organoaluminum compounds represented by the above formula [XI].

(1) Compounds of the formula $R^d_n Al(OR^e)_{3-n}$, for example, dimethylaluminum methoxide, diethylaluminum ethoxide and diisobutylaluminum methoxide;

(2) Compounds of the formula $R^d_n Al(OSiR^f_3)_{3-n}$, for example, $Et_2Al(OSiMe_3)$, $(iso-Bu)_2Al(OSiMe_3)$ and $(iso-Bu)_2Al(OSiEt_3)$;

(3) Compounds of the formula $R^d_n Al(OAlR^g_2)_{3-n}$, for example, $Et_2AlOAlEt_2$ and $(iso-Bu)_2AlOAl(iso-Bu)_2$;

(4) Compounds of the formula $R^d_n Al (NR^h_2)_{3-n}$, for example, $Me_2AlNEt_2$, $Et_2AlNHMe$, $Me_2AlNHEt$, $Et_2AlN(SiMe_3)_2$ and $(iso-Bu)_2AlN(SiMe_3)_2$;

(5) Compounds of the formula $R^d_n Al(SiR^i_3)_{3-n}$, for example, $(iso-Bu)_2AlSiMe_3$; and (6) Compounds of the formula $R^d_n Al(N(R^j)AlR^k_2)_{3-n}$, for example, $Et_2AlN(Me)AlEt_2$ and $(iso-Bu)_2AlN(Et)Al(iso-Bu)_2$.

Of the organoaluminum compounds represented by the above formulas [IX] and [XI], preferred are compounds of the formulas $R^d_3Al$, $R^d_n Al(OR^e)_{3-n}$ and $R^d_n Al(OAlR^g_2)_{3-n}$, and particularly preferred are compounds of those formulas wherein $R^d$ is an isoalkyl group and n is 2.

[Polymerization process]

In the first to third processes for olefin polymerization according to the invention, an olefin is polymerized in the presence of the olefin polymerization catalyst formed from the transition metal compound (A-1), (A-2) or (A-3); the organoaluminum oxy-compound or the organoboron compound (B); and if necessary the organoaluminum compound (C).

In the first to third processes for olefin polymerization according to the invention, the polymerization can be carried out by any of a liquid phase polymerization method, e.g., a slurry polymerization method, a solution polymerization method or a suspension polymerization method, and a gas phase polymerization method.

In the liquid phase polymerization method, an inert hydrocarbon solvent can be used, or an olefin for use in the polymerization can be per se used as a solvent.

Examples of the hydrocarbon media include aliphatic hydrocarbons such as butane, isobutane, pentane, hexane, octane, decane, dodecane, hexadecane and octadecane; alicyclic hydrocarbons such as cyclopentane, methylcyclopentane, cyclohexane and cyclooctane; aromatic hydrocarbons such as benzene, toluene and xylene; petroleum fractions such as gasoline, kerosine and gas oil.

If an olefin is polymerized by a slurry polymerization method, a solution polymerization method or a gas phase polymerization method in the first to third processes for olefin polymerization according to the invention, the transition metal compound (A-1), (A-2) or (A-3) is desirably used in an amount of usually $10^{-8}$ to $10^{-1}$ mol/liter, preferably $10^{-7}$ to $5 \times 10^{-2}$ mol/liter, in terms of a concentration of the transition metal compound in the polymerization reaction system. An atomic ratio of aluminum in the organoaluminum oxy-compound to the transition metal compound (A-1), (A-2) or (A-3) (Al/transition metal compound) is desired to be in the range of usually 10 to 10,000, preferably 20 to 5,000. A molar ratio of the organoboron compound to the transition metal compound (A-1), (A-2) or (A-3) (organoboron compound/transition metal compound) is desired to be in the range of usually 1 to 5000, preferably 1 to 1000.

When the slurry polymerization is carried out in the first to third processes for olefin polymerization according to the invention, the polymerization temperature is in the range of usually $-50°$ to $100°$ C. preferably $0°$ to $90°$ C. When the liquid phase polymerization is carried out, the polymerization temperature is in the range of usually $0°$ to $250°$ C. preferably $15°$ to $200°$ C. When the gas phase polymerization is carried out, the polymerization temperature is in the range of usually $0°$ to $120°$ C., preferably $20°$ to $100°$ C. The polymerization pressure is in the range of usually atmospheric pressure to 100 kg/cm$^2$, preferably atmospheric pressure to 50 kg/cm$^2$. The polymerization can be conducted either batchwise, semicontinuously or continuously. The polymerization may be conducted in two or more stages having different reaction conditions.

The molecular weight of the resulting polymer can be regulated by allowing hydrogen to exist in the polymerization system or varying the polymerization temperature.

Examples of olefins to be polymerized in the first to third processes for olefin polymerization according to the invention include:

α-olefins of 2 to 20 carbon atoms, such as ethylene, propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene; and cycloolefins of 3 to 20 carbon atoms, such as cyclopentene, cycloheptene, norbornene, 5-methyl-2-norbornene, tetracyclododecene and 2-methyl-1,5,8-dimethano-1,2,3,4,4a,5,8,8a-octahydronphthalene.

Also employable are styrene, vinylcyclohexane and diene.

In the first to third processes for olefin polymerization, the olefin polymerization catalyst may be prepolymerized with an α-olefin prior to the olefin polymerization.

In the prepolymerization, an olefin polymer is desirably produced in an amount of 0.05 to 500 g, preferably 0.1 to 300 g, more preferably 0.2 to 100 g, based on 1 g of the olefin polymerization catalyst.

Examples of the olefins used for the prepolymerization include α-olefins of 2 to 20 carbon atoms such as ethylene, propylene, 1-butene, 1-pentene, 4-methyl-1-pentene, 1-hexene, 1-octene, 1-decene, 1-dodecene, 1-tetradecene, 3-methyl-1-butene and 3-methyl-1-pentene. Of these, preferred is the same olefin as used in the polymerization.

EFFECT OF THE INVENTION

In the first and second olefin polymerization catalysts and the first and second processes for olefin polymerization, the transition metal compound (A-1) or (A-2) represented by the formula [I] or [II] is used as a transition metal compound catalyst component. Hence, polyolefin having a wide molecular weight distribution can be obtained in spite of the catalyst system using one kind of a transition metal compound, and besides the catalyst and the process are excellent in the polymerization activity.

Further, since polyolefin having a wide molecular weight distribution can be obtained in the catalyst system using one kind of a transition metal compound, the molecular weight distribution of the resulting polymer can be easily controlled as compared with the catalyst system using plural kinds of transition metal compounds.

In the third olefin polymerization catalyst and the third process for olefin polymerization, the transition metal compound (A-3) represented by the formula [III] is used as a transition metal compound catalyst component. Hence, polyolefin having a high molecular weight can be obtained and besides the catalyst and the process are excellent in the polymerization activity at low temperature.

EXAMPLE

The present invention will be further described with reference to the following example, but it should be construed that the invention is in no way limited to those examples.

In the present invention, the intrinsic viscosity [η], the molecular weight distribution (Mw/Mn), the weight average molecular weight (Mw) and the propylene content were measured in the following manner.

Intrinsic viscosity [η]

The intrinsic viscosity [η] was measured in decalin at 135° C. and expressed by dl/g.

Molecular weight distribution (degree of dispersion, Mw/Mn)

The molecular weight distribution was measured by gel permeation chromatography (GPC) using o-dichlorobenzen at 140° C.

Weight average molecular weight (Mw)

The weight average molecular weight was measured by GPC using tetrahydrofrane at 40° C. The result is indicated in terms of polystyrene.

Propylene Content

The propylene content was calculated from a ratio of absorbance at 1150 $cm^{-1}$ to that at 4335 $cm^{-1}$, and absorbance was measured by using I.R. spectrum.

[Preparation of transition metal compounds]

(Synthesis of a transition metal compound [I'-a])

A glass container thoroughly purged with argon was charged with 50 ml of dry toluene and 0.59 g of bis(cyclopentadienyl) zirconium dichloride, and they were stirred at room temperature to give a homogeneous solution. After the solution was cooled to –78° C., 2.5 ml (4.1 mmol) of a n-hexane solution of n-butyllithium was dropwise added thereto, followed by stirring at the same temperature for 1 hour.

To the reaction solution was added 0.63 ml of dimethylphenylphoshine at –78° C., and the temperature of the system was elevated to room temperature and, then, reaction was performed for 1 hour. To the reaction solution thus obtained was added 0.59 g of bis(cyclopentadienyl) zirconium dichloride, followed by reacting them at 140° C. for 3 hours.

After the solvent was distilled off from the obtained reaction mixture under reduced pressure, 30 ml of benzene was added to the system to give a solution. Then, oxygen was further introduced into the system to perform reaction. The solvent was distilled off under reduced pressure, then toluene was added, and the insoluble portion was removed by filtration. Thereafter, the reaction product was recrystallized to obtain 0.43 g of a complex (transition metal compound). The structure of the transition metal compound thus obtained was determined based on $^1$H-NMR. The structure of this transition metal compound is shown below.

In the following structural formula, Cp means a cyclopentadienyl group.

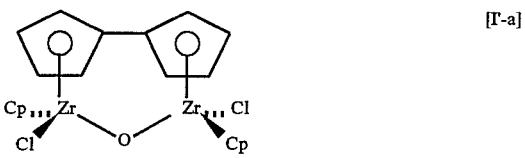

[I'-a]

$^1$H-NMR (270 MHz, CDCl$_3$): δ=6.29 (s, 10H), 6.75 (m, 2H), 6.58 (m, 2H), 6.35(m, 2H), 5.99(m, 2H)

(Synthesis of a transition metal compound [I'-b])

A glass container thoroughly purged with argon was charged with 1.02 g of Li$_2$[Me$_2$Si(C$_5$H$_4$)$_2$] and 2.68 g of monocyclopentadienylzirconium trichloride. To the container was further added 40 ml of dry toluene and, then, reaction was performed at 140° C. for 7 hours. After the insoluble portion produced was removed by filtration, the solvent was distilled off to obtain a solid.

The solid was recrystallized from chloroform to obtain 0.61 g of a white crystal (transition metal compound). The structure of the transition metal compound thus obtained was determined based on $^1$H-NMR. The structure of this transition metal compound is shown below.

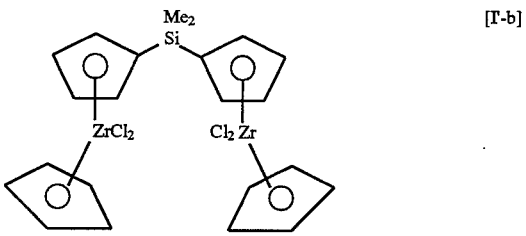

[I'-b]

$^1$H-NMR (270 MHz, CDCl$_3$): δ=6.60 (t, 4H), 6.44 (t, 4H), 6.28 (s, 10H), 0.53 (s, 6H)

(Synthesis of a transition metal compound [I'-c])

A glass container thoroughly purged with argon was charged with 2.24 g of the transition metal compound [I'-b] synthesized above, and thereto was added 35 ml of dry methylene chloride to give a solution. To the solution were added 0.65 g of aniline and 0.063 g of water and, then, reaction was performed at room temperature for 1 hour. After the insoluble portion was removed by filtration, the solvent was distilled off under reduced pressure to obtain a solid.

The solid was recrystallized from chloroform to obtain 0.43 g of a white crystal (transition metal compound). The structure of the transition metal compound thus obtained was determined based on $^1$H-NMR.

The structure of this transition metal compound is shown below. In the following structural formula, Cp means a cyclopentadienyl group.

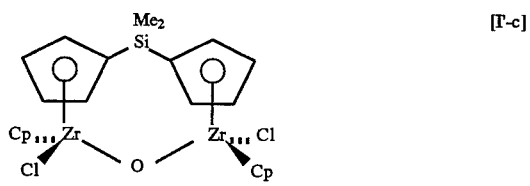

[I'-c]

$^1$H-NMR (270 MHz, CDCl$_3$): δ=6.56 (m, 2H), 6.51 (m, 2H), 6.45 (m, 2H), 6.36 (m, 2H), 6.29 (s, 10H), 0.42 (s, 6H)

(Synthesis of a transition metal compound [I'-d])

A glass container thoroughly purged with argon was charged with 0.64 g of monocyclopentadienyltitanium trichloride, and thereto was further added 20 ml of dry tetrahydrofuran to give a solution. The solution was cooled to −78° C. To the solution was dropwise added a tetrahydrofuran solution containing 0.29 g of Li$_2$[Me$_2$Si(C$_5$H$_4$)$_2$] and reaction was performed at −78° C. for 2 hours. Then, the temperature of the system was elevated to room temperature and the reaction was continued for another 4 hours.

The solvent was distilled off from the obtained reaction mixture under reduced pressure, then benzene was added, and the insoluble portion was removed by filtration. Thereafter, the reaction product was recrystallized to obtain 0.55 g of a complex (transition metal compound). The structure of the transition metal compound thus obtained was determined based on $^1$H-NMR. The structure of this transition metal compound is shown below.

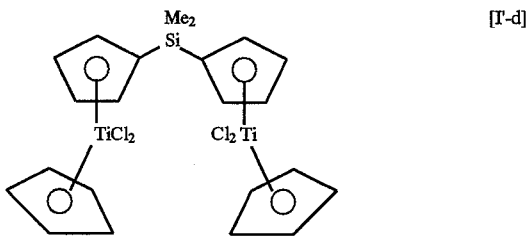

[I'-d]

$^1$H-NMR (270 MHz, THF-d$_8$): δ=6.84 (t, 4H), 6.65 (t, 4H), 6.51 (s, 10H), 0.63 (s, 6H)

(Synthesis of a transition metal compound [II'-a])

A glass container thoroughly purged with argon was charged with 0.43 g of Li$_2$[Me$_2$Si (C$_5$H$_4$)$_2$], and thereto was added 20 ml of dry tetrahydrofuran to give a solution. After the solution was cooled to −78° C., a tetrahydrofuran solution containing 0.57 g of monocyclopentadienylzirconium trichloride was dropwise added to the solution and, then, reaction was performed at −78° C. for 1 hour. Thereafter, the temperature of the system was elevated to room temperature to continue the reaction for another 2 hours. The temperature was again cooled to −78° C. Then, a tetrahydrofuran solution containing 0.48 g of monocyclopentadienyltitanium trichloride was dropwise added to perform reaction at room temperature for 10 hours. The solvent was distilled off under reduced pressure, then chloroform was added, and the insoluble portion produced was filtered off. Thereafter, the solvent was distilled off again under reduced pressure to obtain a solid.

The solid was recrystallized from chloroform to obtain 0.07 g of a red crystal (transition metal compound). The structure of the transition metal compound thus obtained was determined based on $^1$H-NMR. The structure of this transition metal compound is shown below.

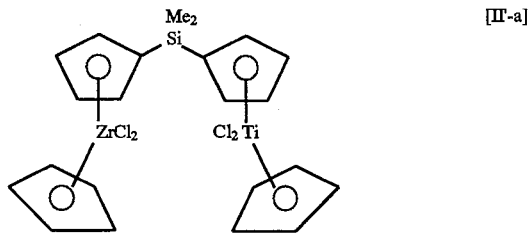

[II'-a]

$^1$H-NMR (270 MHz, THF-d$_8$): δ=6.82 (t, 2H), 6.75 (t, 2H), 6.65 (t, 2H), 6.62 (t, 2H), 6.48 (s, 5H), 6.43 (s, 5H), 0.65 (s, 6H)

(Synthesis of a transition metal compound [III'-a])

A glass flask thoroughly purged with argon was charged with 3.72 g of ferrocene, and thereto was added 100 ml of ether to give a solution. After the solution was cooled to 0° C., 17.5 ml of a hexane solution of n-butyllithim [factor (f)=1.71 mol/l (M)] was dropwise added and, then, reaction was performed at room temperature for 24 hours. The resulting solution was dropwise added to an ether solution containing 7.74 g of dimethylsilyl dichloride at room temperature and, then, reaction was performed at the same temperature for 2 hours. The precipitate produced was removed by a glass filter, and the solvent was distilled off under reduced pressure to obtain an orange-colored oil. To the orange-colored oil was added 30 ml of tetrahydrofuran, and the resulting mixture was cooled to −78° C. To the mixture was dropwise added 37.1 ml of a tetrahydrofuran solution of cyclopentadienyllithium (f=0.21M) and reaction was performed at −78° C. for 0.5 hour. Thereafter, the temperature of the system was elevated to room temperature and reaction was performed for another 3 hours. The solvent was distilled off under reduced pressure, and to the residue was added 80 ml of hexane. Then, the insoluble portion was removed by a glass filter, and 7.8 ml of a hexane solution of n-butyllithium (f=1.71M) was added at 0° C., followed by drying at room temperature for 1 hour. The orange precipitate produced was filtered, washed with hexane, and dried under reduced pressure to obtain a lithium salt (1).

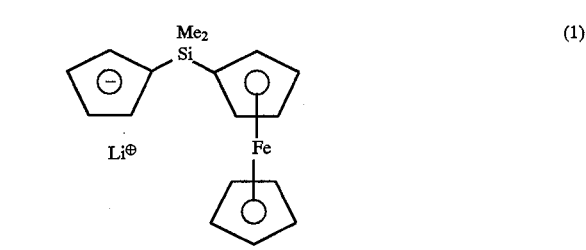

(1)

A glass flask was charged with 1.29 g of the lithium salt (1) synthesized above, and thereto was added 20 ml of tetrahydrofuran to give a solution. To the solution was dropwise added 33.3 ml of a tetrahydrofuran solution of cyclopentadienylzirconium trichloride (f=0.123M) at room temperature and reaction was performed for 12 hours. Then, the solvent was distilled off under reduced pressure, toluene was added thereto, and the insoluble portion was removed by a glass filter. Thereafter, the solvent was again distilled off under reduced pressure to obtain a solid. The solid was recrystallized from toluene to obtain 0.63 g of an yellow orange crystal (transition metal compound). The structure of the transition metal compound thus obtained was determined based on $^1$H-NMR. The structure of this transition metal compound is shown below.

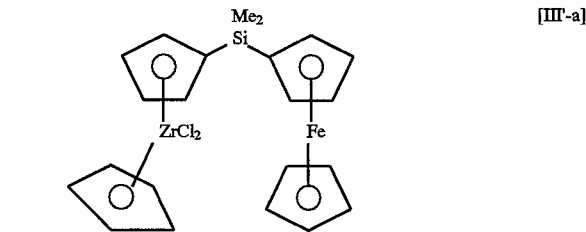

[III'-a]

$^1$H-NMR (270 MHz, CDCl$_3$): δ=6.70 (t, 2H), 6.25 (t, 2H), 6.21 (s, 5H), 4.44 (t, 2H), 4.21 (s, 5H), 0.57 (s, 6H)

(Synthesis of a transition metal compound [II'-b])

A glass flask was charged with 0.22 g of the lithium salt (1) synthesized above, and thereto was added 8 ml of tetrahydrofuran to give a solution. To the solution was added 0.24 g of pentamethylcyclopentadienylzirconium trichloride and reaction, was performed at 110° C. for 4 hours. Then, the solvent was distilled off under reduced pressure, toluene was added thereto, and the insoluble portion was removed by a glass filter. Thereafter, the solvent was again distilled off under reduced pressure to obtain a solid. The solid was recrystallized from hot hexane to obtain 0.20 g of a light yellow-brown crystal (transition metal compound). The structure of the transition metal compound thus obtained was determined based on $^1$H-NMR. The structure of this transition metal compound is shown below.

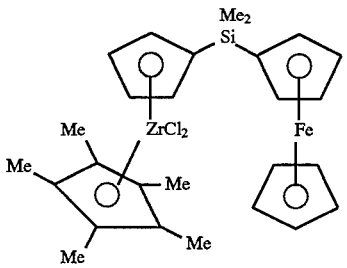

[III'-b]

$^1$H-NMR(270MH$_2$, CDCl$_3$): δ=6.47 (t,2H), 6.10 (t,2H), 4.32 (t, 2H), 4.09 (t, 2H), 4.08 (s, 5H), 1.99 (s, 15H), 0.59 (s, 6H).

(Synthesis of a transition metal compound [III'-c])

A glass flask was charged with 3.8 ml of a tetrahydrofuran solution of the lithium salt (1) synthesized above (f=0.10M). To the solution was added 0.16 g of pentamethylcyclopentadienylhafnium trichloride and reaction was performed at 80° C. for 6 hours. Then, the solvent was distilled off under reduced pressure, hexane was added thereto, and the insoluble portion was removed by a glass filter. Thereafter, the solvent was again distilled off under reduced pressure to obtain a solid. The solid was recrystallized from hexane to obtain 0.16 g of a light yellow crystal (transition metal compound). The structure of the transition metal compound thus obtained was determined based on $^1$H-NMR. The structure of this transition metal compound is shown below.

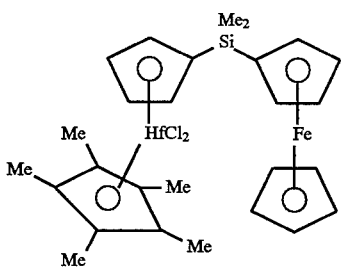

[III'-c]

$^1$H-NMR(270MH$_2$, CDCl$_3$): δ=6.39 (t, 3H), 6.06 (t, 2H), 4.31 (t, 2H), 4.09 (t, 2H), 4.08 (s, 5H), 2.04 (s, 15H), 0.59 (s, 6H).

(Synthesis of a transition metal compound [III'-d])

A glass flask was charged with 0.13 g of the lithium salt (1) synthesized above, and thereto was added 4 ml of tetrahydrofuran to give a solution. To the solution was dropwise added 0.088 ml of a tetrahydrofuran solution of cyclopentadienyltitanium trichloride (f=0.123M) at room temperature and reaction was performed for 5 hours. Then, the solvent was distilled off under reduced pressure, toluene was added, and the insoluble portion was removed by a glass filter. Thereafter, the solvent was again distilled off under reduced pressure to obtain a solid. The solid was recrystallized from hot toluene to obtain 0.099 g of a dark red crystal (transition metal compound). The structure of the transition metal compound thus obtained was determined based on $^1$H-NMR. The structure of this transition metal compound is shown below.

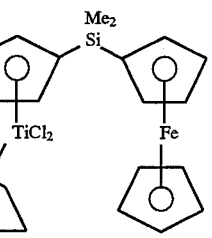

[III-d]

$^1$H-NMR (270 MHz, CDCl$_3$): δ=6.88 (t, 2H), 6.59 (t, 2H), 6.31 (s, 5H), 4.45 (hr. s, 2H), 3.21 (hr. s, 5H), 4.16 (s, 5H), 0.56 (s, 6H)

(Synthesis of a transition metal compound [III-c])

A glass flask was charged with 4.0 ml of a tetrahydrofuran solution of the lithium salt (1) synthesized above (f=0.10M). To the solution was added 2.0 ml of a tetrahydrofuran solution of zirconium tetrachloride (f=0.10M) and reaction was performed at 80° C. for 6 hours. Then the solvent was distilled off under reduced pressure, hexane was added thereto, and the insoluble portion was removed by a glass filter. Thereafter, the solvent was again distilled off under reduced pressure to obtain a solid. The solid was washed with hexane to obtain 0.06 g of a light yellow-brown crystal (transition metal compound). The structure of the transition metal compound thus obtained was determined based on $^1$H-NMR. The structure of this transition metal compound is described below.

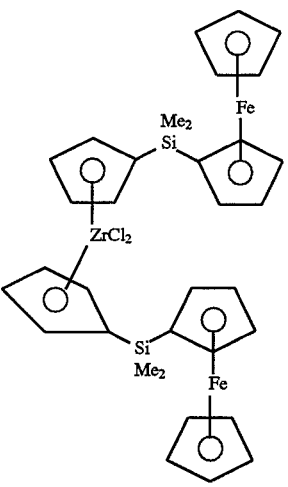

[III-c]

$^1$H-NMR(270MH$_2$, CDCl$_3$): δ=6.51 (t, 4H), 6.20 (t, 4H), 4.39 (t, 4H), 4.14 (t, 4H), 4.11 (s, 10H), 0.54 (s, 12H).

(Synthesis of a transition metal compound [III-e])

A glass flask was charged with 0.13 g of the lithium salt (1) synthesized above and 5 ml of tetrahydrafurane to obtain a solution. To the solution was added 0.055 g of hafnium tetrachloride at −78° C. and the temperature was elevated to the room temperature. Then, reaction was performed at 80° C. for 6 hours. The solvent was distilled off under reduced pressure, hexane was added thereto, and the insoluble portion was removed by a glass filter. Thereafter, the solvent was again distilled off under reduced pressure to obtain a solid. The solid was washed with hexane to obtain 0.034 g of a light yellow-brown crystal (transition metal compound). The structure of the transition metal compound thus obtained was determined based on $^1$H-NMR. The structure of this transition metal compound is described below.

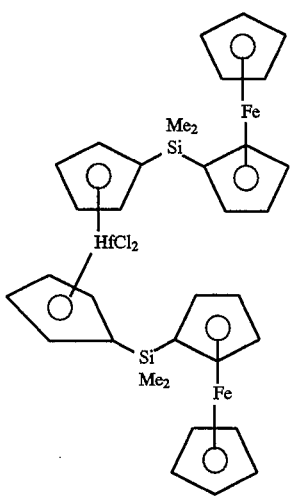

$^1$H-NMR(270MH$_2$, CDCl$_3$): δ=6.42 (t, 4H), 6.10 (t, 4H), 4.39 (t, 4H), 4.14 (t, 4H), 4.11 (s, 10H), 0.53 (s, 12H).

[Polymerization of ethylene]

Example 1

A 500 ml glass flask thoroughly purged with nitrogen was charged with 200 ml of purified toluene, and the temperature of the solvent was elevated up to 60° C. while feeding ethylene at a feed rate of 100 1/hr.

To the solvent was added methylaluminoxane (MAO) in an amount of 0.75'10$^{-3}$ mol in terms of aluminum atom and was then added the transition metal compound [I'-a] synthesized above in an amount of 0.5×10$^{-6}$ mol, to initiate polymerization.

[III-e]

the transition metal compound, the amount of methylaluminoxane and the polymerization time were varied to those shown in Table 1. The results are set forth in Table 1.

Reference Example 1

A 500 ml glass flask thoroughly purged with nitrogen was charged with 200 ml of purified toluene, and the temperature of the system was elevated up to the temperature shown in Table 1 while feeding ethylene at a feed rate of 100 1/hr.

To the system was added methylaluminoxane in an amount of 0.38×10$^{-3}$ mol in terms of aluminum atom and was then added bis(cyclopentadienyl)zirconium dichloride in an amount of 0.5×10$^{-6}$ mol, to initiate polymerization.

Keeping the polymerization temperature at 60° C., the polymerization was carried out for 3 minutes. Then, methanol was added to terminate the polymerization. To the resulting polymer suspension was added a small amount of hydrochloric acid, and the mixture was filtered to obtain polyethylene. The polyethylene was washed with acetone and dried under reduced pressure. The yield, the intrinsic viscosity and the molecular weight distribution of the polyethylene obtained are set forth in Table 1.

Reference Example 2

Ethylene was polymerized in the same manner as described in Reference Example 1 except that the transition metal compound shown in Table 1 was used as a transition metal compound in place of bis(cyclopentadienyl)zirconium dichloride, and that the amount of methylaluminoxane and the polymerization time were varied to those shown in Table 1. The results are set forth in Table 1.

TABLE 1

| | Transition metal compound | | MAO No. of | | | | | Molecular |
| --- | --- | --- | --- | --- | --- | --- | --- | --- |
| | Kind | No. of moles × 10$^{-6}$ | moles (1) × 10$^{-3}$ | Time (min) | Temperature (°C.) | Yield (2) | [η] (dl/g) | weight distribution (Mw/Mn) |
| Ex. 1 | I'-a | 0.5 | 0.75 | 10 | 60 | 0.80 | 5.42 | 3.13 |
| Ex. 2 | I'-a | 1.0 | 0.75 | 15 | 60 | 1.46 | 5.37 | 3.20 |
| Ex. 3 | I'-b | 0.5 | 0.75 | 20 | 60 | 1.04 | 5.61 | 3.28 |
| Ex. 4 | I'-b | 0.5 | 1.50 | 10 | 60 | 1.10 | 5.68 | 3.52 |
| Ex. 5 | I'-c | 0.5 | 1.50 | 18 | 60 | 0.82 | 5.16 | 3.41 |
| Ex. 6 | I'-c | 1.0 | 1.50 | 25 | 60 | 0.92 | 5.42 | 3.41 |
| Ex. 7 | I'-d | 1.0 | 1.50 | 40 | 60 | 0.41 | 4.11 | 3.14 |
| Ex. 8 | I'-d | 2.0 | 1.50 | 30 | 60 | 0.53 | 3.87 | 3.92 |
| Ref. Ex. 1 | Cp$_2$ZrCl$_2$ | 0.5 | 0.38 | 3 | 60 | 1.04 | 4.92 | 2.07 |
| Ref. Ex. 2 | (Cp$_2$ZrCl)$_2$O | 0.5 | 0.75 | 4 | 60 | 1.60 | 4.60 | 2.05 |

(1): in terms of aluminum atoms
(2): amount (g) of polymer

Keeping the polymerization temperature at 60° C., the polymerization was carried out for 10 minutes. Then, methanol was added to terminate the polymerization. To the resulting polymer suspension was added a small amount of hydrochloric acid, and the mixture was filtered to separate polyethylene. The polyethylene was washed with acetone and dried under reduced pressure. The yield, the intrinsic viscosity and the molecular weight distribution of the polyethylene obtained were set forth in Table 1.

Examples 2-8

Ethylene was polymerized in the same manner as described in Example 1 except that the kind and amount of Example 9

A 500 ml glass flask thoroughly purged with nitrogen was charged with 200 ml of purified toluene, and the temperature of the solvent was elevated up to 60° C. while feeding ethylene at a feed rate of 100 1/hr.

To the solvent was added triisobutylaluminum in an amount of 0.4×10$^{-3}$ mol and was then added the transition metal compound [I'-b] synthesized above in an amount of 2.0×10$^{-6}$ mol. After the system was kept at 60° C. for 1 minute, to the system was further added tris(pentafluorophenyl)borane in an amount of 2.0×10$^{-6}$ mol to initiate polymerization.

Keeping the polymerization temperature at 60° C., the polymerization was carried out for 10 minutes. Then, methanol was added to terminate the polymerization. To the resulting polymer suspension were added a small amount of hydrochloric acid and a large amount of methanol to precipitate a polymer. Then, the polymer was separated by filtration. The polyethylene thus obtained was washed with acetone and dried under reduced pressure. The results are set forth in Table 2.

Examples 10 & 11

Ethylene was polymerized in the same manner as described in Example 9 except that dimethylaniliniumtetrakis(pentafluorophenyl)borate was used as an organoborone compound in place of tris (pentafluorophenyl)borane, trimethylalumium or triisobutylaluminum was used as an organoaluminum compound in place of triisobutylaluminum, and that the polymerization time was varied to that shown in Table 2. The results are set forth in Table 2.

a transition metal compound in place of the transition metal compound [I'-b], and that the amount of the transition metal compound, the amount of methylaluminoxane, the feed rates of ethylene and propylene and the polymerization time were varied to those shown in Table 3. The results are set forth in Table 3.

TABLE 3

| Transition metal compound | | MAO | Ethylene feed rate (l/hr) | Propylene feed rate (l/hr) |
|---|---|---|---|---|
| Kind | No. of moles × $10^{-6}$ | No. of moles$^{(1)}$ × $10^{-3}$ | | |
| Ex. 12 | I'-b | 5.0 | 3.8 | 70 | 30 |
| Ex. 13 | I'-b | 2.0 | 1.5 | 50 | 50 |
| Ex. 14 | I'-b | 2.0 | 1.5 | 30 | 70 |
| Ref. Ex. 3 | Cp$_2$ZrCl$_2$ | 2.0 | 1.5 | 70 | 30 |
| Ref. | Cp$_2$ZrCl$_2$ | 2.0 | 1.5 | 50 | 50 |

TABLE 2

| | Transition metal compound | | Organoboron compound | | Organoaluminum compound | | Time (min) | Temperature (°C.) | Yield (2) | [η] (dl/g) | Molecular weight distribution (Mw/Mn) |
|---|---|---|---|---|---|---|---|---|---|---|---|
| | Kind | No. of moles × $10^{-6}$ | Kind | No. of moles × $10^{-6}$ | Kind | No. of moles × $10^{-3}$ | | | | | |
| Ex. 9 | I'-b | 2.0 | B(C$_6$F$_5$)$_3$ | 2.0 | i-Bu$_3$Al | 0.4 | 10 | 60 | 0.21 | 5.96 | 2.82 |
| Ex. 10 | I'-b | 2.0 | (3) | 2.0 | Me$_3$Al | 0.4 | 15 | 60 | 0.49 | 3.30 | 2.42 |
| Ex. 11 | I'-b | 2.0 | (3) | 2.0 | i-Bu$_3$Al | 0.4 | 5 | 60 | 1.06 | 6.21 | 2.13 |

(2): amount (g) of polymer
(3): PhHNMe$_2$·B(C$_6$F$_5$)$_4$

[Copolymerization of ethylene and propylene]

Example 12

Copolymerization of ethylene and propylene was carried out in the same manner as described in Example 1 except that ethylene and propylene were fed at feed rates of 70 l/hr and 30 l/hr, respectively, instead of feeding ethylene at a feed rate of 100 l/hr, the transition metal compound [I'-b] was used as a transition metal compound in place of the transition metal compound [I'-a], and that the amount of the transition metal compound, the amount of methylaluminoxane and the polymerization temperature were varied to those shown in Table 3. The yield, the intrinsic viscosity, propylene content and the molecular weight distribution of the ethylene-propylene copolymer obtained are set forth in Table 3.

Examples 13 & 14

Copolymerization of ethylene and propylene was carried out in the same manner as described in Example 12 except that the feed rates of ethylene and propylene, the amount of the transition metal compound, the amount of methylaluminoxane and the polymerization time were varied to those shown in Table 3. The results are set forth in Table 3.

Reference Examples 3–5

Copolymerization of ethylene and propylene was carried out in the same manner as described in Example 12 except that bis(cyclopentadienyl)zirconium dichloride was used as TABLE 3-continued

| | | | | | |
|---|---|---|---|---|---|
| Ex. 4 Ref. Ex. 5 | Cp$_2$ZrCl$_2$ | 2.0 | 1.5 | 30 | 70 |

| | Time (min) | Temperature (°C.) | Yield (2) | [η] (dl/g) | Propylene content (% by mol) | Molecular distribution (Mw/Mn) |
|---|---|---|---|---|---|---|
| Ex. 13 | 10 | 30 | 1.82 | 2.19 | 12 | 4.02 |
| Ex. 14 | 20 | 30 | 1.16 | 1.80 | 18 | 5.14 |
| Ex. 15 | 20 | 30 | 0.51 | 0.73 | 34 | 5.56 |
| Ref. Ex. 3 | 16 | 30 | 13.34 | 0.81 | 19 | 2.09 |
| Fef. Ex. 4 | 15 | 30 | 5.48 | 0.95 | 26 | 3.00 |
| Ref. Ex. 5 | 30 | 30 | 13.11 | 0.37 | 37 | 2.88 |

$^{(1)}$in terms of aluminum atoms
$^{(2)}$amount (g) of polymer

[Polymerization of ethylene]

Example 15

A 500 ml glass flask thoroughly purged with nitrogen was charged with 200 ml of purified toluene, and the temperature of the system was elevated up to 60° C. while feeding ethylene at a feed rate of 100 l/hr.

To the system was added methylaluminoxane (MAO) in an amount of 0.75×10$^{-3}$ mol in terms of aluminum atom and was then added the transition metal compound [II'-a] synthesized above in an amount of $1.0\times10^{-6}$ mol to initiate polymerization.

Keeping the polymerization temperature at 60° C., the polymerization was carried out for 10 minutes. Then, methanol was added to terminate the polymerization. To the resulting polymer suspension was added a small amount of hydrochloric acid, and the mixture was filtered to separate polyethylene. The polyethylene was washed with acetone and dried under reduced pressure. The yield, the intrinsic viscosity and the molecular weight distribution of the polyethylene obtained are set forth in Table 4.

Reference Examples 9–11

Ethylene was polymerized in the same manner as described in Reference Example 6 except that the transition metal shown in Table 4 was used in place of bis (cyclopentadienyl)zirconium dichloride, and that the amount of methylaluminuoxane, the polymerization time and the polymerization temperature were varied to those shown in Table 4. The results are set forth in Table 4.

TABLE 4

| | Transition metal compound | | MAO No. of | | | | | Molecular |
|---|---|---|---|---|---|---|---|---|
| | Kind | No. of moles × $10^{-6}$ | moles (1) × $10^{-3}$ | Time (min) | Temperature (°C.) | Yield (2) | [η] (dl/g) | weight distribution (Mw/Mn) |
| Ex. 15 | II'-a | 1.0 | 0.75 | 10 | 60 | 1.21 | 5.26 | 4.99 |
| Ex. 16 | II'-a | 1.0 | 1.50 | 10 | 60 | 1.59 | 3.979 | 5.55 |
| Ex. 17 | II'-a | 2.0 | 0.75 | 10 | 60 | 1.11 | 4.63 | 5.49 |
| Ex. 18 | II'-a | 1.0 | 0.75 | 15 | 30 | 0.75 | 9.69 | 5.15 |
| Ex. 19 | II'-a | 1.0 | 0.75 | 30 | 90 | 1.28 | 1.15 | 5.92 |
| Ref. Ex. 6 | $Cp_2ZrCl_2$ | 0.5 | 0.38 | 3 | 60 | 1.04 | 4.9 | 2.07 |
| Ref. Ex. 7 | $Cp_2ZrCl_2$ | 0.5 | 0.38 | 5 | 30 | 0.80 | 8.21 | 1.90 |
| Ref. Ex. 8 | $Cp_2ZrCl_2$ | 0.5 | 0.38 | 10 | 90 | 2.15 | 1.31 | 1.89 |
| Ref. Ex. 9 | $(Cp_2ZrCl)_2O$ | 0.5 | 0.75 | 4 | 60 | 1.60 | 4.60 | 2.05 |
| Ref. Ex. 10 | $(Cp_2ZrCl)_2O$ | 0.5 | 0.75 | 6 | 30 | 0.98 | 8.48 | 2.00 |
| Ref. Ex. 11 | $(Cp_2ZrCl)_2O$ | 0.5 | 0.75 | 5 | 90 | 2.03 | 1.18 | 1.76 |

(1): in terms of aluminum atoms
(2): amount (g) of polymer

Examples 16–19

Ethylene was polymerized in the same manner as described in Example 15 except that the amounts of a transition metal compound and methylaluminoxane, the polymerization time and the polymerization temperature were varied to those shown in Table 4. The results are set forth in Table 4.

Reference Example 6

A 500 ml glass flask thoroughly purged with nitrogen was charged with 200 ml of purified toluene, and the temperature of the system was elevated up to 60° C. while feeding ethylene at a feed rate of 100 1/hr.

To the system was added methylaluminoxane (MAO) in an amount of $0.38\times10^{-3}$ mol in terms of aluminum atom and was then added the bis(cyclopentadienyl)zirconium dichloride in an amount of $0.5\times10^{-8}$ mol to initiate polymerization.

Keeping the polymerization temperature at 60° C., the polymerization was carried out for 3 minutes. Then, methanol was added to terminate the polymerization. To the resulting polymer suspension was added a small amount of hydrochloric acid, and the mixture was filtered to obtain polyethylene. The polyethylene was washed with acetone and dried under reduced pressure. The yield, the intrinsic viscosity and the molecular weight distribution of the polyethylene obtained are set forth in Table 4.

Reference Examples 7 & 8

Ethylene was polymerized in the same manner as described in Reference Example 6 except that the polymerization time and the polymerization temperature were varied to those shown in Table 4. The results are set forth in Table 4.

[Copolymerization of ethylene and propylene]

Example 20

Copolymerization of ethylene and propylene was carried out in the same manner as described in Example 15 except that ethylene and propylene were fed at feed rates of 70 1/hr and 30 1/hr, respectively, instead of feeding ethylene at a feed rate of 100 1/hr, and that the amount of the transition metal compound, the amount of methylaluminoxane, the polymerization time and the polymerization temperature were varied to those shown in Table 5. The yield, the intrinsic viscosity, the propylene content and the molecular weight distribution of the ethylene-propylene copolymer obtained are set forth in Table 5. In Table 5, the results in Reference Examples 3, 4 and 5 are also indicated for the comparison sake.

Examples 21 & 22

Copolymerization of ethylene and propylene was carried out in the same manner as described in Example 20 except that the feed rates of ethylene and propylene and the polymerization time were varied to those shown in Table 5. The results are set forth in Table 5.

TABLE 5

| | Transition metal compound | | MAO | Propyl- |
| --- | --- | --- | --- | --- |
| | Kind | No. of moles × $10^{-6}$ | No. of moles[1] × $10^{-3}$ | Ethylene feed rate (l/hr) | ene feed rate (l/hr) |
| Ex. 20 | II'-a | 2.0 | 1.5 | 70 | 30 |
| Ex. 21 | II'-a | 2.0 | 1.5 | 50 | 50 |
| Ex. 22 | II'-a | 2.0 | 1.5 | 30 | 70 |
| Ref. Ex. 3 | $Cp_2ZrCl_2$ | 2.0 | 1.5 | 70 | 30 |
| Fef. Ex. 4 | $Cp_2ZrCl_2$ | 2.0 | 1.5 | 50 | 50 |
| Ref. Ex. 5 | $Cp_2ZrCl_2$ | 2.0 | 1.5 | 30 | 70 |

| | Time (min) | Temperature (°C.) | Yield [2] | [η] (dl/g) | Propylene content (% by mol) | Molecular distribution (Mw/Mn) |
| --- | --- | --- | --- | --- | --- | --- |
| Ex. 20 | 20 | 30 | 0.90 | 4.46 | 11 | 5.08 |
| Ex. 21 | 30 | 30 | 0.62 | 1.79 | 22 | 6.33 |
| Ex. 22 | 30 | 30 | 1.59 | 0.73 | 34 | 6.67 |
| Ref. Ex. 3 | 16 | 30 | 13.34 | 0.81 | 19 | 2.09 |
| Fef. Ex. 4 | 15 | 30 | 5.48 | 0.95 | 26 | 3.00 |
| Ref. Ex. 5 | 30 | 30 | 13.11 | 0.37 | 37 | 2.88 |

[1] in terms of aluminum atoms
[2] amount (g) of polymer

Example 23

A 500 ml glass flask thoroughly purged with nitrogen was charged with 200 ml of purified toluene, and the temperature of the solvent was elevated up to 60° C. while feeding ethylene at a feed rate of 100 l/hr.

To the solvent was added triisobutylaluminum in an amount of $0.4 \times 10^{-3}$ mol and was then added the transition metal compound [I'-a] synthesized above in an amount of $2.0 \times 10^{-5}$ mol. After the system was kept at 60° C. for 1 minute, to the system was further added dimethylanilinium tetrakis(pentafluorophenyl)borate in an amount of $2.0 \times 10^{-6}$ mol to initiate polymerization.

Keeping the polymerization temperature at 60° C., the polymerization was carried out for 5 minutes. Then, methanol was added to terminate the polymerization. To the resulting polymer suspension were added a small amount of hydrochloric acid and a large amount of methanol to precipitate a polymer. Then, the polymer was separated by filtration. The polyethylene thus obtained was washed with acetone and dried under reduced pressure. The yield of the polyethylene thus obtained was 1.11 g and the intrinsic viscosity was 6.81 (dl/g).

Example 24

A 500 ml glass flask thoroughly purged with nitrogen was charged with 200 ml of purified toluene, and the temperature of the system was elevated up to 45° C. while feeding ethylene at a feed rate of 100 l/hr.

To the system was added methylaluminoxane (MAO) in an amount of $0.75 \times 10^{-3}$ mol in terms of aluminum atom and was then added the transition metal compound [III'-a] synthesized above in an amount of $1.0 \times 10^{-6}$ mol to initiate polymerization.

Keeping the polymerization temperature at 45° C., the polymerization was carried out for 1.5 minutes. Then, methanol was added to terminate the polymerization. To the resulting polymer suspension was added a small amount of hydrochloric acid, and the mixture was filtered to obtain polyethylene. The polyethylene was washed with acetone and dried under reduced pressure. The yield, the polymerization activity and the intrinsic viscosity of the polyethylene obtained are set forth in Table 6.

Examples 25–31

Ethylene was polymerized in the same manner as described in Example 24 except that the transition metal compound, the polymerization time and the polymerization temperature were varied to those shown in Table 6. The results are set forth in Table 6.

Reference Example 12

A 500 ml glass flask thoroughly purged with nitrogen was charged with 200 ml of purified toluene, and the temperature of the system was elevated up to 45° C. while feeding ethylene at a feed rate of 100 l/hr.

To the system was added methylaluminoxane in an amount of $0.38 \times 10^{-3}$ mol in terms of aluminum atom and was then added bis(cyclopentadienyl)zirconium dichloride in an amount of $0.5 \times 10^{-8}$ mol, to initiate polymerization.

Keeping the polymerization temperature at 45° C., the polymerization was carried out for 3 minutes. Then, methanol was added to terminate the polymerization. To the resulting polymer suspension was added a small amount of hydrochloric acid, and the mixture was filtered to obtain polyethylene. The polyethylene was washed with acetone and dried under reduced pressure. The yield, the polymerization activity and the intrinsic viscosity of the polyethylene obtained are set forth in Table 7.

Reference Examples 13 & 14

Ethylene was polymerized in the same manner as described in Reference Example 12 except that the polymerization time and the polymerization temperature were varied to those shown in Table 7. The results are set forth in Table 7.

Reference Examples 15 & 16

Ethylene was polymerized in the same manner as described in Reference Example 12 except that bis (cyclopentadienyl)hafnium dichloride was used as a transition metal compound in place of bis(cyclopentadienyl) zirconium dichloride, and that the amount of methylaluminoxane, polymerization time and the polymerization temperature were varied to those shown in Table 7. The results are set forth in Table 7.

TABLE 6

| | Transition metal compound | | MAO | | | | Polymer- | |
|---|---|---|---|---|---|---|---|---|
| | Kind | No. of moles × $10^{-6}$ | No. of moles (1) × $10^{-3}$ | Time (min) | Temperature (°C.) | Yield (2) | ization Activity (3) | [η] (dl/g) |
| Ex. 24 | III'-a | 1.0 | 0.75 | 1.5 | 45 | 0.93 | 37,000 | 7.36 |
| Ex. 25 | III'-a | 1.0 | 0.75 | 5 | 30 | 1.10 | 13,000 | 11.9 |
| Ex. 26 | III'-a | 1.0 | 0.75 | 3 | 0 | 0.61 | 12.000 | 13.3 |
| Ex. 27 | III'-b | 1.0 | 0.75 | 2 | 45 | 0.06 | 18,000 | 5.21 |
| Ex. 28 | III'-c | 1.0 | 0.75 | 5 | 30 | 0.41 | 4,900 | 12.0 |
| Ex. 29 | III'-c | 1.0 | 0.75 | 5 | 15 | 0.48 | 5,700 | 17.1 |
| Ex. 30 | III-c | 1.0 | 0.75 | 1 | 30 | 0.52 | 31,000 | 15.8 |
| Ex. 31 | III-c | 1.0 | 0.75 | 5 | 0 | 0.96 | 12,000 | 14.7 |

(1): in terms of aluminum atoms
(2): amount (g) of polymer
(3): g-PE/mmol transition metal compound · hr

TABLE 7

| | Transition metal compound | | MAO | | | | Polymer- | |
|---|---|---|---|---|---|---|---|---|
| | Kind | No. of moles × $10^{-6}$ | No. of moles (1) × $10^{-3}$ | Time (min) | Temperature (°C.) | Yield (2) | ization Activity (3) | [η] (dl/g) |
| Ref. Ex. 12 | Cp$_2$ZrCl$_2$ | 0.5 | 0.38 | 3 | 45 | 1.04 | 42,000 | 6.01 |
| Ref. Ex. 13 | Cp$_2$ZrCl$_2$ | 0.5 | 0.38 | 5 | 30 | 0.80 | 19,000 | 8.21 |
| Ref. Ex. 14 | Cp$_2$ZrCl$_2$ | 1.0 | 0.75 | 5 | 0 | 0.53 | 6,400 | 11.2 |
| Ref. Ex. 15 | Cp$_2$HfCl$_2$ | 1.0 | 0.75 | 10 | 30 | 0.31 | 1,900 | 11.9 |
| Ref. Ex. 16 | Cp$_2$HfCl$_2$ | 1.0 | 0.75 | 20 | 15 | 0.26 | 800 | 11.6 |

(1): in terms of aluminum atoms
(2): amount (g) of polymer
(3): g-PE/mmol transition metal compound · hr Example 32

A 500 ml glass flask thoroughly purged with nitrogen was charged with 200 ml of purified toluene, and the temperature of the system was elevated up to 60° C. while feeding ethylene at a feed rate of 100 1/hr.

To the system was added triisobutylaluminum in an amount of 0.2×10$^{-3}$ mol and was then added the transition metal compound [III'-a] synthesized above in an amount of 1.0×10$^{-6}$ mol. After the system was kept at 60° C. for 1 minute, tris(pentafluorophenyl)borane was added in an amount of 1.0×10$^{-6}$ mol to initiate polymerization.

Keeping the polymerization temperature at 60° C., the polymerization was carried out for 3 minutes. Then, methanol was added to terminate the polymerization. To the resulting polymer suspension were added a small amount of hydrochloric acid and a large amount of methanol to precipitate a polymer. Then, the polymer was separated by filtration. The polyethylene thus obtained was washed with acetone and dried under reduced pressure. The yield, the polymerization activity and the intrinsic viscosity of the polyethylene obtained are set forth in Table 8.

Examples 33–43

Ethylene was polymerized in the same manner as described in Example 32 except that dimethylaniliniumtetrakis(pentafluorophenyl)borate or triphenylcarboniumtetrakis(pentafluorophenyl)borate was used and that the polymerization conditions were varied to those shown in Table 8. The results are set forth in Table 8.

Reference Example 17

Ethylene was polymerized in the same manner as described in Example 32 except that bis(cyclopentadienyl) dichloride was used as a transition metal compound in place of the transition metal compound [III'-a] and the amount of the transition metal compound, that the amount of the organoborane compound and the polymerization time were varied to those shown in Table 9. The yield, the intrinsic viscosity and the molecular weight distribution of the polyethylene obtained are set forth in Table 9.

Reference Example 18

Ethylene was polymerized in the same manner as described in Example 32 except that bis(cyclopentadienyl) dichloride was used as a transition metal compound in place of the transition metal compound [III'-a] and dimethylalminiumtetrakis(pentafluorophenyl)borate was used in place of tris(pentafluorophenyl)borane, and the amount of the transition metal compound, that the amount of organoborone compound and the polymerization time were varied to those shown in Table 9. The yield, the polymerization activity and the intrinsic viscosity of the polyethylene obtained are set forth in Table 9.

Reference Examples 19–22

Ethylene was polymerized in the same manner as described in Example 32 except that bis(cyclopentadienyl) zirconium dichloride was used as a transition metal compound and dimethylaniliniumtetrakis(pentafluorophenyl) borate or triphenylcarboniumtetrakis(pentafluorophenyl) borate was used as an organoborane compound, and that the polymerization temperature and the polymerization time were varied to those shown in Table 9. The results are set forth in Table 9.

Keeping the polymerization temperature at 15° C., the polymerization was carried out for 8 minutes. Then, methanol was added to terminate the polymerization. To the resulting polymer suspension was added a small amount of hydrochloric acid, and the mixture was filtered to separate polyethylene. The polyethylene was washed with acetone

TABLE 8

| | Transition metal compound | | Organo-boron compound | | Organo-aluminum compound | | | | | | |
|---|---|---|---|---|---|---|---|---|---|---|---|
| | Kind | No. of moles × $10^{-6}$ | Kind | No. of moles × $10^{-6}$ | Kind | No. of moles × $10^{-3}$ | Time (min) | Temperature (°C.) | Yield (1) | Activity (4) | [η] (dl/g) |
| Ex. 32 | III'-a | 1.0 | $B(C_6F_5)_3$ | 1.0 | i-$Bu_3Al$ | 0.2 | 3 | 60 | 1.22 | 24,000 | 6.22 |
| Ex. 33 | III'-a | 1.0 | (2) | 1.0 | i-$Bu_3Al$ | 0.2 | 3 | 60 | 1.06 | 21,000 | 6.70 |
| Ex. 34 | III'-a | 0.5 | (2) | 0.5 | i-$Bu_3Al$ | 0.2 | 1 | 45 | 0.46 | 55,000 | 7.94 |
| Ex. 35 | III'-a | 0.5 | (2) | 0.5 | i-$Bu_3Al$ | 0.2 | 1.5 | 30 | 0.45 | 36,000 | 10.2 |
| Ex. 36 | III'-a | 0.5 | (2) | 0.5 | i-$Bu_3Al$ | 0.2 | 8 | 0 | 0.86 | 13,000 | 12.3 |
| Ex. 37 | III'-a | 1.0 | (2) | 1.0 | $Me_3Al$ | 0.2 | 3 | 60 | 2.16 | 43,000 | 5.49 |
| Ex. 38 | III'-a | 0.25 | (2) | 0.25 | $Me_3Al$ | 0.2 | 0.5 | 45 | 0.18 | 87,000 | 7.32 |
| Ex. 39 | III'-a | 0.5 | (2) | 0.5 | $Me_3Al$ | 0.2 | 0.5 | 30 | 0.26 | 64,000 | 8.98 |
| Ex. 40 | III'-a | 0.5 | (2) | 0.5 | $Me_3Al$ | 0.2 | 10 | 0 | 0,48 | 5,800 | 13.8 |
| Ex. 41 | III'-a | 0.25 | (3) | 0.25 | i-$Bu_3Al$ | 0.2 | 0.5 | 45 | 0.50 | 230,000 | 6.46 |
| Ex. 42 | III'-a | 0.25 | (3) | 0.25 | $Me_3Al$ | 0.2 | 1 | 45 | 0.47 | 120,000 | 7.35 |
| Ex. 43 | III-c | 0.25 | (2) | 0.25 | $Me_3Al$ | 0.2 | 0.5 | 30 | 0.18 | 85,000 | 10.9 |

(1): amount (g) of polymer
(2): $PhHNMe_2 \cdot B(C_6F_5)_4$
(3): $Ph_3C \cdot B(C_6F_5)_4$
(4): g-PE/mmol-transition metal compound · hr

TABLE 9

| | Transition metal compound | | Organo-boron compound | | Organo-aluminum compound | | | | | Polymerization | |
|---|---|---|---|---|---|---|---|---|---|---|---|
| | Kind | No. of moles × $10^{-6}$ | Kind | No. of moles × $10^{-6}$ | Kind | No. of moles × $10^{-3}$ | Time (min) | Temperature (°C.) | Yield (1) | Activity (4) | [η] (dl/g) |
| Ref. Ex. 17 | $Cp_2ZrCl_2$ | 0.5 | $B(C_6F_5)_3$ | 1.0 | i-$Bu_3Al$ | 0.2 | 2 | 60 | 0.80 | 24,000 | 3.42 |
| Ref. Ex. 18 | $Cp_2ZrCl_2$ | 0.5 | (2) | 1.0 | i-$Bu_3Al$ | 0.2 | 4 | 60 | 1.21 | 18,000 | 3.91 |
| Ref. Ex. 19 | $Cp_2ZrCl_2$ | 0.5 | (2) | 1.0 | i-$Bu_3Al$ | 0.2 | 5 | 45 | 0.81 | 20,000 | 6.09 |
| Ref. Ex. 20 | $Cp_2ZrCl_2$ | 1.0 | (2) | 0.5 | i-$Bu_3Al$ | 0.2 | 5 | 30 | 0.60 | 15,000 | 7.20 |
| Ref. Ex. 21 | $Cp_2ZrCl_2$ | 0.5 | (2) | 1.0 | i-$Bu_3Al$ | 0.2 | 10 | 0 | 1.18 | 7,100 | 12.1 |
| Ref. Ex. 22 | $Cp_2ZrCl_2$ | 0.5 | (3) | 0.5 | $Me_3Al$ | 0.4 | 2 | 45 | 1.22 | 73,000 | 4.65 |

(1): amount (g) of polymer
(2): $PhHNMe_2 \cdot B(C_6F_5)_4$
(3): $Ph_3C \cdot B(C_6F_5)_4$
(4): g-PE/mmol-transition metal compound · hr

[Polymerization of ethylene]

Example 44

A 500 ml glass flask thoroughly purged with nitrogen was charged with 200 ml of purified toluene, and the temperature of the solvent was kept at 15° C. while feeding ethylene at a feed rate of 100 1/hr. To the solvent was added methylaluminoxane (MAO) in an amount of $0.75 \times 10^{-3}$ mol in terms of aluminum atom and was then added the transition metal compound [III-e] synthesized above in an amount of $1.0 \times 10^{-6}$ mol, to initiate polymerization.

and dried under reduced pressure. The yield of the polyethylene obtained was 0.33 g.

[Polymerization of propylene]

Example 45

A 500 ml glass flask thoroughly purged with nitrogen was charged with 200 ml of purified toluene, and the temperature of the solvent was elevated up to 30° C. while feeding propylene at a feed rate of 100 1/hr.

To the solvent was added trimethylaluminum in an amount of $2.0 \times 10^{-3}$ mol and was then added the transition metal compound [III'-a] synthesized above in an amount of 1.0×10⁻⁵ mol. After the system was kept at 30° C. for 1 minute, to the system was further added dimethylanilinium tetrakis(pentafluorophenyl)borate in an amount of 1.0×10⁻⁵ mol to initiate polymerization.

Keeping the polymerization temperature at 30° C., the polymerization was carried out for 30 minutes. Then, methanol was added to terminate the polymerization. The resulting polymer solution was treated with hydrochloric acid for deashing and the toluene in the solution was distilled off to obtain a polymer. Then, the polypropylene thus obtained was dried under reduced pressure. The yield, the polymerization activity and the weight average molecular weight (Mw) are set forth in Table 10.

Examples 46–50

Propylene was polymerized in the same manner as described in Example 45 except that the amounts of the transition metal compound and the organoaluminum compound, and the amount and kind of the organoaluminum compound were varied to those shown in Table 10, and that the polymerization time and the polymerization temperature were varied to those shown in Table 10. The results were set forth in Table 10.

Reference Examples 23 & 24

Propylene was polymerized in the same manner as described in Example 45 except that bis(cyclopentadienyl) zirconium dichloride or (1,3-dimethylcyclopentadienyl) zirconium dichloride was used, and that the amounts of the transition metal compound and trimethylaluminum, the amount and kind of the organoborone compound, and the polymerization temperature were varied to those shown in Table 10. The results are set forth in Table 10.

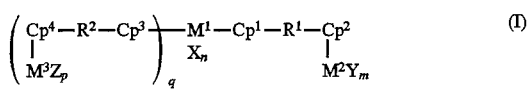

wherein $M^1$, $M^2$ and $M^3$ are the same metals as each other and are each one metal selected from Sc, Y, Ti, Zr, Hf, V, Nb, Ta, Cr, Mo, W and lanthanoid metals;

$Cp^1$, $Cp^2$, $Cp^3$ and $Cp^4$ are each one group having a cyclopentadienyl skeleton, which may have a substituent, and the groups having a cyclopentadienyl skeleton may be the same as or different from each other;

$R^1$ and $R^2$ are each one bond group selected from the group consisting of an alkylene group, a substituted alkylene group, a silylene group, a substituted silylene group, a divalent tin-containing group and a divalent germanium-containing group or a single bond and the groups may be the same as or different from each other; and X, Y and Z are each one group selected from a hydrocarbon group, a nitrogen-containing group, an oxygen-containing group, a silicon-containing group, a phosphorus-containing group and a sulfur-containing group, or an atom selected from a halogen atom and a hydrogen atom, the groups or atoms indicated by X, Y and Z may be the same as or different from each other, and a pair of X and Y, a pair of Y and Z, or a pair of X and Z may form a bond group selected from —O— and —S—, or may form a divalent bond group containing at least one atom selected from an oxygen atom, a carbon atom, a silicon atom, a germanium atom, a phosphorus atom and a sulfur atom; and n is an integer of 1–5;

m is an integer of 1–5;

TABLE 10

| | Transition metal compound | | Organoboron compound | | Organoaluminum compound | | | | | |
|---|---|---|---|---|---|---|---|---|---|---|
| | Kind | No. of moles × 10⁻⁶ | Kind | No. of moles × 10⁻⁶ | Kind | No. of moles × 10⁻³ | Time (min) | Temperature (°C.) | Yield (1) | Polymerization Activity (4) | Mw (× 10³) |
| Ex. 45 | III'-a | 10.0 | (4) | 10.0 | Me₃Al | 2.0 | 30 | 30 | 3.55 | 710 | 32 |
| Ex. 46 | III'-a | 5.0 | (5) | 5.0 | Me₃Al | 1.0 | 30 | 30 | 3.07 | 1,200 | 35 |
| Ex. 47 | III'-a | 4.0 | (4) | 20.0 | Me₃Al | 1.0 | 30 | 30 | 2.65 | 1,300 | 33 |
| Ex. 48 | III'-a | 5.0 | (4) | 5.0 | Me₃Al | 1.0 | 40 | 15 | 5.27 | 1,600 | 110 |
| Ex. 49 | III'-a | 4.0 | (5) | 4.0 | Me₃Al | 0.8 | 20 | 15 | 1.46 | 1,100 | 120 |
| Ex. 50 | III'-a | 3.0 | (5) | 15.0 | Me₃Al | 0.6 | 12 | 15 | 1.97 | 3,300 | 110 |
| Ref. Ex. 23 | Cp₂ZrCl₂ | 4.0 | (5) | 20.0 | Me₃Al | 0.8 | 30 | 15 | 2.42 | 1,200 | 30 |
| Ref. Ex. 24 | (1,3-Me₂Cp)₂ZrCl₂ | 4.0 | (5) | 20.0 | Me₃Al | 0.8 | 30 | 15 | 3.16 | 1,600 | 76 |

(1): amount (g) of polymer
(2): g-PE/mmol-transition metal compound · hr
(3): interms of Polystyrene
(4): PhHNMe₂·B(C₆F₅)₄
(5): Ph₃C·B(C₆F₅)₄

What is claimed is:

1. An olefin polymerization catalyst comprising (A-1) a transition metal compound and (B) an organoaluminum oxy-compound selected from the group consisting of an aluminoxane compound and a benzene-insoluble organoaluminum oxy-compound or an organoboron compound, said transition metal compound being represented by the following formula (I):

p is an integer of 1–5; and q is 0 or 1.

2. The olefin polymerization catalyst as claimed in claim 1, wherein said transition metal compound is a transition metal compound represented by the following formula (I'):

$$Cp^1\text{—}R^1\text{—}Cp^2 \quad\quad (I')$$
$$M^1X_n \quad M^2Y_m$$

wherein $M^1$ and $M^2$ are the same metals as each other and are each one metal selected from Sc, Y, Ti, Zr, Hf, V, Nb, Ta, Cr, Mo, W and lanthanoid metals;

Cp$^1$ and Cp$^2$ are each a group having a cyclopentadienyl skeleton, which may have a substituent, and the groups having a cyclopentadienyl skeleton may be the same as or different from each other;

X and Y are each a group selected from a hydrocarbon group, a nitrogen-containing group, an oxygen-containing group, a silicon-containing group, a phosphorus-containing group and a sulfur-containing group, or an atom selected from a halogen atom and a hydrogen atom, the groups or atoms indicated by X and y may be the same as or different from each other, and a pair of X and Y may form a bond group selected from —O— and —S—, or may form a divalent bond group containing at least one atom selected from an oxygen atom, a carbon atom, a silicon atom, a germanium atom, a phosphorus atom and a sulfur atom; and n is an integer of 1–5; and m is an integer of 1–5.

3. The olefin polymerization catalyst as claimed in claim 2, wherein the transition metal compound is represented by the formula [I'] in which $M^1$ and $M^2$ are each selected from Zr, Ti, Hf, V, Nb and Ta, and are the same as each other.

4. The olefin polymerization catalyst as claimed in claim 2, wherein the transition metal compound is represented by the formula [I'] in which $M^1$ and $M^2$ are each Zr, Ti or Hf; R$^1$ is one bond group selected from an alkylene group, a substituted alkylene group, a silylene group, a substituted silylene group and a divalent germanium-containing group, or a single bond; at least one of the groups indicated by X is a group having a cyclopentadienyl skeleton, which may have a substituent; and at least one of the groups indicated by Y is a group having a cyclopentadienyl skeleton, which may have a substituent.

5. The olefin polymerization catalyst as claimed in claim 2, wherein the transition metal compound is represented by the formula [I'] in which $M^1$ and $M^2$ are each Zr or Ti; R$^1$ is one bond group selected from an alkylene group, a substituted alkylene group, a silylene group, a substituted silylene group and a divalent germanium-containing group, or a single bond; at least one of the groups indicated by X is a group having a cyclopentadienyl skeleton, which may have a substituent, while the others are halogen atoms; and at least one of the groups indicated by Y is a group having a cyclopentadienyl skeleton, which may have a substituent, while the others are halogen atoms.

6. A olefin polymerization catalyst comprising (A-2) a transition metal compound and (B) an organoaluminum oxy-compound selected from the group consisting of an aluminoxane compound and a benzene-insoluble organoaluminum oxy-compound or an organoboron compound, said transition metal compound being represented by the following formula (II):

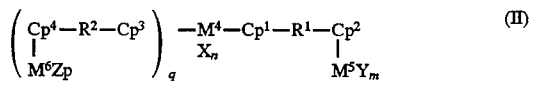

$$\left(\begin{matrix} Cp^4\text{—}R^2\text{—}Cp^3 \\ | \\ M^6Z_p \end{matrix}\right)_q \begin{matrix} \text{—}M^4\text{—}Cp^1\text{—}R^1\text{—}Cp^2 \\ X_n \quad\quad | \\ \quad\quad M^5Y_m \end{matrix} \quad (II)$$

wherein $M^1$, $M^2$ and $M^3$ are each one metal selected from Sc, Y, Ti, Zr, Ef, V, Nb, Ta, Cr, Mo, W and lanthanoid metals, and at least two of $M^1$, $M^2$ and $M^3$ are different from each other;

Cp$^1$, Cp$^2$, Cp$^3$ and Cp$^4$ are each a group having a cyclopentadienyl skeleton, which may have a substituent, and the groups having a cyclopentadienyl skeleton may be the same as or different from each other;

R$^1$ and R$^2$ are each one bond group selected from the group consisting of an alkylene group, a substituted alkylene group, a silylene group, a substituted silylene group, a divalent tin-containing group and a divalent germanium-containing group or a single bond and the groups may be the same as or different from each other; and n is an integer of 1–5;

m is an integer of 1–5;

P is an integer of 1–5; and q is 0 or 1.

7. The olefin polymerization catalyst as claimed in claim 6, wherein said transition metal compound is a transition metal compound represented by the following formula (II'):

$$Cp^1\text{—}R^1\text{—}Cp^2 \quad\quad (II')$$
$$M^4X_n \quad M^5Y_m$$

wherein $M^4$ and $M^5$ are each one metal selected from Sc, Y, Ti, Zr, Hf, V, Nb, Ta, Cr, Mo, W and lanthanoid metals, and are different from each other;

Cp$^1$ and Cp$^2$ are each a group having a cyclopentadienyl skeleton, which may have a substituent, and the groups having a cyclopentadienyl skeleton may be the same as or different from each other;

R$^1$ is a divalent group containing carbon atom, silicone atom, tin atom, germanium atom, phosphorus atom or sulfur atom, or a single bond;

X an Y are each a group selected from a hydrocarbon group, a nitrogen-containing group, an oxygen-containing group, a silicon-containing group, a phosphorus-containing group and a sulfur-containing group, or an atom selected from a halogen atom and a hydrogen atom, the groups or atoms indicated by X and Y may be the same as or different from each other, and a pair of X and Y may form a bond group selected from —O— and —S—, or may form a divalent bond group containing at least one atom selected from an oxygen atom, a carbon atom, a silicon atom, a germanium atom, a phosphorus atom and a sulfur atom;

n is an integer of 1–5; and m is an integer of 1–5.

8. The olefin polymerization catalyst as claimed in claim 7, wherein the transition metal compound is represented by the formula [II'] in which $M^4$ and $M^5$ are each one metal selected from Zr, Ti, Hf, V, Nb and Ta, and are different from each other.

9. The olefin polymerization catalyst as claimed in claim 7, wherein the transition metal compound is represented by the formula [II'] in which $M^4$ and $M^5$ are each one metal selected from Zr, Ti and Hf, and are different from each other; R$^1$ is one bond group selected from an alkylene group, a substituted alkylene group, a silylene group, a substituted silylene group, a divalent germanium-containing group, or a single bond; at least one of the groups indicated by X is a group having a cyclopentadienyl skeleton, which may have a substituent; and at least one of the groups indicated by Y is a group having a cyclopentadienyl skeleton, which may have a substituent.

10. The olefin polymerization catalyst as claimed in claim 7, wherein the transition metal compound is represented by the formula [II'] in which $M^4$ is Zr; $M^5$ is Ti; $R^1$ is one bond group selected from an alkylene group, a substituted alkylene group, a silylene group, a substituted silylene group and a divalent germanium-containing group, or a single bond; at least one of the groups indicated by X is a group having a cyclopentadienyl skeleton, which may have a substituent, while the rest are halogen atoms; and at least one of the groups indicated by Y is a group having a cyclopentadienyl skeleton, which may have a substituent, while the rest are halogen atoms.

11. A olefin polymerization catalyst comprising (A-3) a transition metal compound and (B) an organoaluminum oxy-compound selected from the group consisting of an aluminoxane compound and a benzene-insoluble organoaluminum oxy-compound or an organoboron compound, said transition metal compound being represented by the following formula (III):

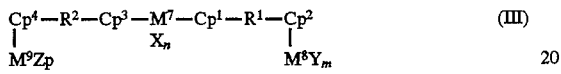

wherein $M^7$ is a transition metal selected from Sc, Y, Ti, Zr, Hf, V, Nb, Ta, Cr, Mo, W and lanthanoid metals, $M^8$ is a transition metal selected from Mn, Tc, Re, Fe, Ru, Os, Co, Rh, Ir, Ni, Pd, Pt, Cu, Ag, Au, Zn, Cd and Hg, and $M^9$ is a transition metal, and $M^7$ and $M^9$, $M^8$ and $M^5$ are the same as or different from each other;

$Cp^1$, $Cp^2$, $Cp^3$ and $Cp^4$ are each a group having a cyclopentadienyl skeleton, which may have a substitutent, and the groups having a cyclopentadienyl skeleton may be the same as or different from each other;

$R^1$ and $R^2$ are each one bond group selected from the group consisting of an alkylene group, a substituted alkylene group, a silylene group, a substituted silylene group, a divalent tin-containing group and a divalent germanium-containing group or a single bond and the groups may be the same as or different from each other; and n is an integer of 1–4;

m is an integer of 1–5; and p is an integer of 1–5.

12. The olefin polymerization catalyst as claimed in claim 11, wherein the transition metal compound is represented by the formula [III] in which $M^7$ is one metal selected from Ti, Zr, Hf, V, Nb and Ta, $M^8$ and $M^9$ are a transition metals selected from Mn, Re, Fe, Ru, Co, Rh, Ir, Ni and Pd and may be the same as or different from each other.

13. The olefin polymerization catalyst as claimed in claim 11, wherein the transition metal compound is represented by the formula [III] in which $M^7$ is one metal selected from Zr, Ti and Hf, $M^8$ and $M^9$ are each one metal selected from Mn, Fe, Ru and Rh and may be the same as or different from each other; $R^1$ and $R^2$ are each one bond group selected from an alkylene group, a substituted alkylene group, a silylene group, a substituted silylene group, a divalent germanium-containing group, or a single bond; at least one of the groups indicated by Y is a group having a cyclopentadienyl skeleton, which may have a substituent; and at least one of the groups indicated by Z is a group having a cyclopentadienyl skeleton, which may have a substituent.

14. The olefin polymerization catalyst as claimed in claim 11, wherein the transition metal compound is represented by the formula [III] in which $M^7$ is one metal selected from Zr, Ti and Hf, $M^8$ and $M^9$ are each Fe; $R^1$ and $R^2$ are each one bond group selected from an alkylene group, a substituted alkylene group, a silylene group and a substituted silylene group, or a single bond; the groups indicated by X are halogen atoms at least one of the groups indicated by Y is a group having a cyclopentadienyl skeleton, which may have a substituent, while the rest are halogen atoms; and at least one of the groups indicated by X is a group having a cyclopentadienyl skeleton, which may have a substituent, while the rest are halogen atoms.

15. The olefin polymerization catalyst as claimed in claim 11, wherein said transition metal compound is a transition metal compound represented by the following formula [III']:

wherein $M^7$ is a transition metal selected from Sc, Y, Ti, Zr, Hf, V, Nb, Ta, Cr, MO, W and lanthanoid metals and $M^8$ is a transition metal selected from Mn, Tc, Re, Fe, Ru, Os, Co, Rh, Ir, Ni, Pd, Pt, Cu, Ag, Au, Zn, Cd and Hg;

$Cp^1$ and $Cp^2$ are each a group having a cyclopentadienyl skeleton, which may have a substituent, and the groups having a cyclopentadienyl skeleton are the same as or different from each other;

$R^1$ is a divalent group containing carbon atom, silicone atom, tin atom, germanium atom, phosphorus atom or sulfur atom, or a single bond;

X and Y are each a group selected from a hydrocarbon group, a nitrogen-containing group, an oxygen-containing group, a silicon-containing group, a phosphorus-containing group and a sulfur-containing group, or an atom selected from a halogen atom and a hydrogen atom, the groups or atoms indicated by X and Y may be the same as or different from each other, and a pair of X and Y may form a bond group selected from —O— and —S—, or may form a divalent bond group containing at least one atom selected from an oxygen atom, a carbon atom, a silicon atom, a germanium atom, a phosphorus atom and a sulfur atom;

n is an integer of 1–5; and m is an integer of 1–5.

16. The olefin polymerization catalyst as claimed in claim 15, wherein the transition metal compound is represented by the formula [III'] in which $M^7$ is one metal selected from Tin, Zr, Hf, V, Nb and Ta, $M^8$ is a transition metal selected from Mn, Re, Fe, Ru, Co, Rh, Ir, Ni and Pd.

17. The olefin polymerization catalyst as claimed in claim 15, wherein the transition metal compound is represented by the formula [III'] in which $M^7$ is one metal selected from Zr, Ti and Hf, $M^8$ is one metal selected from Mn, Fe, Ru and Rh; $R^1$ is one bond group selected from an alkylene group, a substituted alkylene group, a silylene group, a substituted silylene group, a divalent germanium-containing group, or a single bond; at least one of the groups indicated by X is a group having a cyclopentadienyl skeleton, which may have a substituent; and at least one of the groups indicated by Y is a group having a cyclopentadienyl skeleton, which may have a substituent.

18. The olefin polymerization catalyst as claimed in claim 15, wherein the transition metal compound is represented by the formula [III'] in which $M^7$ is one metal selected from Zr, Ti and Hf, $M^8$ is Fe; $R^1$ is one bond group selected from an alkylene group, a substituted alkylene group, a silylene group and a substituted silylene group, or a single bond; at least one of the groups indicated by X is a group having a cyclopentadienyl skeleton, which may have a substituent, while the others are halogen atoms; and at least one of the groups indicated by Y is a group having a cyclopentadienyl skeleton, which may have a substituent, while the others are halogen atoms.

19. The olefin polymerization catalyst as claimed in claim 1, wherein the organoaluminum oxy-compound is an aluminoxane compound.

20. The olefin polymerization catalyst as claimed in claim 6, wherein the organoaluminum oxy-compound is an aluminoxane compound.

21. The olefin polymerization catalyst as claimed in claim 11, wherein the organoaluminum oxy-compound is an aluminoxane compound.

22. The olefin polymerization catalyst as claimed in claim 1, wherein the organoaluminum oxy-compound is a benzene-insoluble organoaluminum oxy-compound selected from a benzene-insoluble organoaluminum oxy-compound obtained by contacting aluminoxane with water or an active hydrogen-containing compound, and a benzene-insoluble organoaluminum oxy-compound obtained by contacting an organoaluminum compound with water.

23. The olefin polymerization catalyst as claimed in claim 6, wherein the organoaluminum oxy-compound is a benzene-insoluble organoaluminum oxy-compound selected from a benzene-insoluble organoaluminum oxy-compound obtained by contacting aluminoxane with water or an active hydrogen-containing compound, and a benzene-insoluble organoaluminum oxy-compound obtained by contacting an organoaluminum compound with water.

24. The olefin polymerization catalyst as claimed in claim 11, wherein the organoaluminum oxy-compound is a benzene-insoluble organoaluminum oxy-compound selected from a benzene-insoluble organoaluminum oxy-compound obtained by contacting aluminoxane with water or an active hydrogen-containing compound, and a benzene-insoluble organoaluminum oxy-compound obtained by contacting an organoaluminum compound with water.

* * * * *